US010227808B2

(12) United States Patent
Siddiqui

(10) Patent No.: US 10,227,808 B2
(45) Date of Patent: Mar. 12, 2019

(54) HINGED DEVICE

(71) Applicant: Microsoft Technology Licensing, LLC, Redmond, WA (US)

(72) Inventor: Kabir Siddiqui, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/947,740

(22) Filed: Nov. 20, 2015

(65) Prior Publication Data

US 2017/0145725 A1    May 25, 2017

(51) Int. Cl.
| | |
|---|---|
| *G06F 1/16* | (2006.01) |
| *E05F 3/20* | (2006.01) |
| *E05D 5/10* | (2006.01) |
| *E05D 3/12* | (2006.01) |

(52) U.S. Cl.
CPC ............... *E05F 3/20* (2013.01); *E05D 3/12* (2013.01); *E05D 5/10* (2013.01); *G06F 1/1616* (2013.01); *G06F 1/1641* (2013.01); *G06F 1/1681* (2013.01); *E05D 2005/106* (2013.01)

(58) Field of Classification Search
CPC ..... G06F 1/1641; G06F 1/1681; G06F 1/1683
USPC ....... 361/679.27, 679.28, 679.55; 455/575.3; 16/320
See application file for complete search history.

(56) References Cited

U.S. PATENT DOCUMENTS

| | | | |
|---|---|---|---|
| 2,040,279 A | 5/1936 | Joseph | |
| 3,289,877 A | 12/1966 | Wolf | |
| 4,493,316 A | 1/1985 | Reed | |
| 4,617,699 A | 10/1986 | Nakamura | |
| 4,718,127 A | 1/1988 | Rittmann et al. | |
| 4,753,331 A | 6/1988 | Dietenberger et al. | |
| 4,845,809 A | 7/1989 | Pillifant, Jr. | |
| 4,949,427 A | 8/1990 | Keller | |
| 4,976,007 A | 12/1990 | Lam | |
| 4,986,763 A | 1/1991 | Boyle | |
| 4,996,739 A | 3/1991 | Baer | |
| 5,041,818 A | 8/1991 | Liu | |
| 5,173,686 A | 12/1992 | Fujihara | |

(Continued)

FOREIGN PATENT DOCUMENTS

| | | |
|---|---|---|
| CN | 1180516 A1 | 12/2004 |
| CN | 103291737 A | 9/2013 |

(Continued)

OTHER PUBLICATIONS

Response filed Jan. 11, 2017 to the Non-Final Office Action dated Nov. 3, 2016 from U.S. Appl. No. 14/947,994, 12 pages.

(Continued)

*Primary Examiner* — Mukund G Patel
(74) *Attorney, Agent, or Firm* — Rainier Patents, P.S.

(57) ABSTRACT

The description relates to devices, such as computing devices that have hinged portions. One example can include a first portion and a second portion. This example can also include a hinge assembly and a magnetic assembly. The hinge assembly can rotatably secure the first portion to the second portion. The magnetic assembly can be positioned relative to the hinge assembly and the first and second portions that bias the first and second portions to a closed position where the first and second portions overlay one another and to an open position where the first and second portions are juxtaposed and coplanar.

20 Claims, 14 Drawing Sheets

(56) References Cited

U.S. PATENT DOCUMENTS

| | | |
|---|---|---|
| 5,229,921 A | 7/1993 | Bohmer |
| 5,448,799 A | 9/1995 | Stein, Jr. |
| 5,509,590 A | 4/1996 | Medeiros et al. |
| 5,566,048 A | 10/1996 | Esterberg |
| 5,606,774 A | 3/1997 | Wu |
| 5,640,690 A | 6/1997 | Kudma |
| 5,666,694 A | 9/1997 | Slow et al. |
| 5,796,576 A | 8/1998 | Kim |
| 5,987,704 A | 11/1999 | Tan |
| 5,995,373 A | 11/1999 | Nagai |
| 6,108,868 A | 8/2000 | Lin |
| 6,223,393 B1 | 5/2001 | Knopf |
| 6,301,489 B1 | 10/2001 | Winstead |
| 6,416,027 B1 | 7/2002 | Hart |
| 6,421,235 B2 | 7/2002 | Ditzik |
| 6,577,496 B1 | 6/2003 | Gioscia et al. |
| 6,628,244 B1 | 9/2003 | Hirosawa |
| 6,766,561 B1 | 7/2004 | Cheng |
| 6,778,381 B1 | 8/2004 | Bolognia et al. |
| 6,813,143 B2 | 11/2004 | Makela |
| 6,925,684 B2 | 8/2005 | Kang |
| 7,058,433 B2 | 6/2006 | Carpenter |
| 7,127,776 B2 | 10/2006 | Park |
| 7,155,266 B2 | 12/2006 | Stefansen |
| 7,266,864 B2 | 9/2007 | Kim |
| 7,293,380 B2 | 11/2007 | Repecki |
| 7,328,481 B2 | 2/2008 | Barnett |
| 7,345,872 B2 | 3/2008 | Wang |
| 7,380,312 B2 | 6/2008 | Ge et al. |
| 7,407,202 B2 | 8/2008 | Ye et al. |
| 7,414,834 B2 | 8/2008 | Ukonaho et al. |
| 7,418,766 B2 | 9/2008 | Nelson et al. |
| 7,436,674 B2 | 10/2008 | Barsun et al. |
| 7,515,406 B2 | 4/2009 | Kee |
| 7,515,707 B2 | 4/2009 | Ka et al. |
| 7,584,524 B2 | 9/2009 | Hung |
| 7,596,358 B2 | 9/2009 | Takagi |
| 7,596,395 B2 | 9/2009 | Gartrell |
| 7,636,985 B2 | 12/2009 | Greenbank |
| 7,753,331 B2 | 7/2010 | Tang |
| 7,758,082 B2 | 7/2010 | Weigel et al. |
| 7,832,056 B2 | 11/2010 | Kuwajima et al. |
| 7,900,323 B2 | 3/2011 | Lin |
| 7,936,559 B2 | 5/2011 | Chen |
| 7,966,694 B2 | 6/2011 | Estlander |
| 7,966,698 B2 | 6/2011 | Barnett |
| 8,032,988 B2 | 10/2011 | Lai et al. |
| 8,050,021 B2 | 11/2011 | Grady et al. |
| 8,122,970 B2 | 2/2012 | Palen |
| 8,170,630 B2 | 5/2012 | Murayama et al. |
| 8,405,978 B2 | 3/2013 | Okutsu |
| 8,441,791 B2 | 5/2013 | Bohn et al. |
| 8,451,601 B2 * | 5/2013 | Bohn .............. G06F 1/1681 16/286 |
| 8,474,101 B2 | 7/2013 | Wang et al. |
| 8,498,100 B1 | 7/2013 | Whit et al. |
| 8,522,401 B2 | 9/2013 | Jin |
| 8,578,561 B2 | 11/2013 | Chuang |
| 8,615,848 B2 | 12/2013 | Mitsui |
| 8,624,844 B2 | 1/2014 | Behar et al. |
| 8,638,546 B2 | 1/2014 | Hoshino |
| 8,649,166 B2 | 2/2014 | Wu et al. |
| 8,665,382 B1 | 3/2014 | Sugimoto et al. |
| 8,687,354 B2 | 4/2014 | Uchiyama et al. |
| 8,713,759 B2 | 5/2014 | Cai |
| 8,776,319 B1 | 7/2014 | Chang et al. |
| 8,780,570 B2 | 7/2014 | Bohn et al. |
| 8,787,016 B2 | 7/2014 | Rothkopf et al. |
| 8,804,324 B2 | 8/2014 | Bohn et al. |
| 8,826,495 B2 | 9/2014 | Jauvtis et al. |
| 8,833,554 B2 | 9/2014 | Busri |
| 8,854,834 B2 * | 10/2014 | O'Connor ............ G06F 1/1641 16/334 |
| 8,855,726 B2 | 10/2014 | Ozawa |
| 8,875,349 B2 | 11/2014 | Hanigan |
| 8,908,364 B2 | 12/2014 | Tseng et al. |
| 8,908,365 B2 | 12/2014 | Walters et al. |
| 8,923,934 B2 | 12/2014 | Chol et al. |
| 8,938,856 B1 | 1/2015 | Shin et al. |
| 8,959,714 B2 | 2/2015 | Hsu |
| 8,971,029 B2 * | 3/2015 | Wong .................. G06F 1/1641 292/341.17 |
| 8,978,206 B2 | 3/2015 | Hsu et al. |
| 8,982,542 B2 | 3/2015 | Bohn |
| 8,988,876 B2 | 3/2015 | Corbin |
| 9,003,607 B1 | 4/2015 | Hsu |
| 9,009,919 B1 * | 4/2015 | Chiang ................ G06F 1/1681 16/303 |
| 9,013,867 B2 | 4/2015 | Becze |
| 9,014,381 B2 | 4/2015 | Quan et al. |
| 9,069,531 B2 | 6/2015 | Bohn et al. |
| 9,103,147 B2 | 8/2015 | Chuang |
| 9,104,381 B2 | 8/2015 | Kuramochi |
| 9,122,455 B2 | 9/2015 | Meyers |
| 9,185,815 B2 | 11/2015 | Hsu |
| 9,201,464 B2 | 12/2015 | Uchiyama et al. |
| 9,243,432 B2 | 1/2016 | Lee |
| 9,290,976 B1 | 3/2016 | Horng |
| 9,310,850 B2 | 4/2016 | Hsu |
| 9,317,243 B2 | 4/2016 | Becze |
| 9,348,450 B1 | 5/2016 | Kim |
| 9,371,676 B2 | 6/2016 | Rittenhouse |
| 9,411,365 B1 | 8/2016 | Tanner et al. |
| 9,417,663 B2 | 8/2016 | Kinoshita et al. |
| 9,430,000 B2 | 8/2016 | Hood, III et al. |
| 9,500,013 B2 | 11/2016 | Senatori |
| 9,507,388 B1 | 11/2016 | Hampton et al. |
| 9,523,226 B1 | 12/2016 | Lam et al. |
| 9,524,000 B2 | 12/2016 | Hsu et al. |
| 9,569,002 B2 | 2/2017 | Walker |
| 9,600,036 B2 | 3/2017 | Uchiyama et al. |
| 9,624,703 B1 | 4/2017 | Lin |
| 9,625,947 B2 | 4/2017 | Lee et al. |
| 9,625,953 B2 | 4/2017 | Bitz et al. |
| 9,625,954 B2 | 4/2017 | Campbell et al. |
| 9,684,343 B2 | 6/2017 | Tazbaz |
| 9,714,533 B2 | 7/2017 | Kuramochi |
| 2002/0147026 A1 * | 10/2002 | Hsieh ................. H04M 1/0216 455/575.3 |
| 2003/0179880 A1 | 9/2003 | Pan et al. |
| 2004/0091101 A1 | 5/2004 | Park |
| 2004/0212956 A1 | 10/2004 | Kuivas et al. |
| 2004/0226138 A1 | 11/2004 | Harmon et al. |
| 2004/0266239 A1 | 12/2004 | Kurokawa |
| 2005/0018393 A1 | 1/2005 | Kuo |
| 2005/0122671 A1 | 6/2005 | Homer |
| 2005/0148375 A1 | 7/2005 | DeLine |
| 2005/0155182 A1 | 7/2005 | Han et al. |
| 2005/0239520 A1 | 10/2005 | Stefansen |
| 2006/0005356 A1 | 1/2006 | Amano et al. |
| 2006/0007648 A1 | 1/2006 | Wang |
| 2006/0046792 A1 | 3/2006 | Hassemer et al. |
| 2006/0059659 A1 | 3/2006 | Kim |
| 2006/0133052 A1 | 6/2006 | Harmon et al. |
| 2006/0179612 A1 | 8/2006 | Oshima et al. |
| 2007/0101541 A1 | 5/2007 | Yin et al. |
| 2007/0117600 A1 | 5/2007 | Robertson et al. |
| 2008/0112113 A1 | 5/2008 | Sawadski et al. |
| 2008/0174089 A1 | 7/2008 | Ekberg |
| 2008/0184530 A1 | 8/2008 | Chao |
| 2008/0239672 A1 | 10/2008 | Ghoshal |
| 2008/0250604 A1 | 10/2008 | Chen et al. |
| 2009/0070961 A1 | 3/2009 | Chung et al. |
| 2009/0104949 A1 | 4/2009 | Sato et al. |
| 2009/0291719 A1 | 11/2009 | Christensen |
| 2010/0205777 A1 | 8/2010 | Kim |
| 2010/0207844 A1 | 8/2010 | Manning |
| 2010/0232100 A1 | 9/2010 | Fukuma et al. |
| 2010/0328250 A1 | 12/2010 | Gorsica et al. |
| 2011/0099756 A1 | 5/2011 | Chen |
| 2011/0115713 A1 | 5/2011 | Altman |
| 2011/0128216 A1 * | 6/2011 | Renwick ............. G06F 1/1618 345/156 |
| 2011/0177850 A1 | 7/2011 | Griffin et al. |

(56) References Cited

U.S. PATENT DOCUMENTS

| | | |
|---|---|---|
| 2011/0205695 A1 | 8/2011 | Hassemer et al. |
| 2011/0292605 A1 | 12/2011 | Chen et al. |
| 2012/0002360 A1 | 1/2012 | Seo et al. |
| 2012/0037047 A1 | 2/2012 | Moldovan |
| 2012/0046076 A1 | 2/2012 | Masser et al. |
| 2012/0120618 A1* | 5/2012 | Bohn .............. G06F 1/1681 361/749 |
| 2012/0120627 A1 | 5/2012 | O'Connor et al. |
| 2012/0127471 A1 | 5/2012 | Urushidani |
| 2012/0137471 A1 | 6/2012 | Kujala |
| 2012/0162866 A1 | 6/2012 | Bohn et al. |
| 2012/0170243 A1 | 7/2012 | Griffin et al. |
| 2012/0206864 A1 | 8/2012 | Bohn et al. |
| 2012/0206893 A1 | 8/2012 | Bohn et al. |
| 2012/0257368 A1 | 10/2012 | Bohn et al. |
| 2012/0307472 A1 | 12/2012 | Bohn et al. |
| 2012/0314399 A1 | 12/2012 | Bohn |
| 2012/0314400 A1 | 12/2012 | Bohn et al. |
| 2013/0010405 A1 | 1/2013 | Rothkopf et al. |
| 2013/0016489 A1 | 1/2013 | Yeh et al. |
| 2013/0016492 A1 | 1/2013 | Wang et al. |
| 2013/0046492 A1 | 2/2013 | Westergaard |
| 2013/0111704 A1 | 5/2013 | Mitsui |
| 2013/0135809 A1 | 5/2013 | Uchiyama et al. |
| 2013/0139355 A1 | 6/2013 | Lee |
| 2013/0152342 A1 | 6/2013 | Ahn |
| 2013/0318746 A1 | 12/2013 | Kuramochi |
| 2013/0322004 A1 | 12/2013 | Park |
| 2013/0342094 A1 | 12/2013 | Walters et al. |
| 2014/0042293 A1 | 2/2014 | Mok et al. |
| 2014/0126133 A1 | 5/2014 | Griffin et al. |
| 2014/0129739 A1 | 5/2014 | King |
| 2014/0174227 A1 | 6/2014 | Hsu et al. |
| 2014/0185215 A1 | 7/2014 | Whitt et al. |
| 2014/0185220 A1 | 7/2014 | Whitt et al. |
| 2014/0196253 A1 | 7/2014 | Song et al. |
| 2014/0217875 A1 | 8/2014 | Park et al. |
| 2014/0246354 A1 | 9/2014 | Probst et al. |
| 2014/0265295 A1 | 9/2014 | Rhyner et al. |
| 2014/0287804 A1 | 9/2014 | Bohn et al. |
| 2014/0290008 A1 | 10/2014 | Hsu |
| 2014/0290009 A1 | 10/2014 | Kasai et al. |
| 2014/0293534 A1 | 10/2014 | Siddiqui |
| 2014/0360296 A1 | 12/2014 | Hsu |
| 2014/0362507 A1 | 12/2014 | Kinoshita et al. |
| 2014/0373338 A1 | 12/2014 | O'Connor et al. |
| 2015/0016040 A1 | 1/2015 | Hood, III et al. |
| 2015/0020351 A1 | 1/2015 | Lin |
| 2015/0092337 A1 | 4/2015 | Tan et al. |
| 2015/0153787 A1 | 6/2015 | Mok et al. |
| 2015/0154437 A1 | 6/2015 | Aoki et al. |
| 2015/0176317 A1 | 6/2015 | Lee |
| 2015/0184437 A1 | 7/2015 | Wikander et al. |
| 2015/0227175 A1 | 8/2015 | Motosugi |
| 2015/0241978 A1 | 8/2015 | Lombardi et al. |
| 2015/0267450 A1 | 9/2015 | Chiang |
| 2015/0277506 A1 | 10/2015 | Cheah et al. |
| 2015/0309539 A1 | 10/2015 | Kamphuis et al. |
| 2015/0345195 A1 | 12/2015 | Park |
| 2015/0361696 A1 | 12/2015 | Tazbaz |
| 2015/0362956 A1 | 12/2015 | Tazbaz |
| 2015/0362958 A1 | 12/2015 | Shang |
| 2016/0041589 A1 | 2/2016 | Tazbaz |
| 2016/0070310 A1 | 3/2016 | Holung et al. |
| 2016/0083988 A1 | 3/2016 | Hsu |
| 2016/0109908 A1 | 4/2016 | Siddiqui |
| 2016/0132075 A1 | 5/2016 | Tazbaz |
| 2016/0132076 A1 | 5/2016 | Bitz et al. |
| 2016/0147267 A1 | 5/2016 | Campbell et al. |
| 2016/0153222 A1 | 6/2016 | Hu |
| 2016/0187934 A1 | 6/2016 | Lee et al. |
| 2016/0187935 A1 | 6/2016 | Tazbaz et al. |
| 2016/0201367 A1 | 7/2016 | Kato |
| 2016/0215541 A1 | 7/2016 | Tazbaz et al. |
| 2016/0224072 A1 | 8/2016 | Huang et al. |
| 2016/0266615 A1 | 9/2016 | Uchiyama et al. |
| 2016/0299537 A1 | 10/2016 | Whitt et al. |
| 2016/0326786 A1 | 11/2016 | Lee |
| 2016/0357226 A1 | 12/2016 | Campbell et al. |
| 2017/0017273 A1* | 1/2017 | Weldon .............. G06F 1/1681 |
| 2017/0090523 A1 | 3/2017 | Tazbaz et al. |
| 2017/0145724 A1 | 5/2017 | Siddiqui |
| 2018/0059735 A1 | 3/2018 | Tazbaz et al. |
| 2018/0066465 A1 | 3/2018 | Tazbaz et al. |
| 2018/0164855 A1 | 6/2018 | Tazbaz et al. |
| 2018/0166842 A1 | 6/2018 | Siddiqui |
| 2018/0209473 A1 | 7/2018 | Park et al. |

FOREIGN PATENT DOCUMENTS

| | | |
|---|---|---|
| CN | 203376667 U | 1/2014 |
| CN | 104331124 A | 2/2015 |
| CN | 204610543 U | 9/2015 |
| EP | 0928092 A2 | 7/1997 |
| EP | 1422593 A1 | 5/2004 |
| EP | 2466420 A1 | 6/2012 |
| EP | 2528307 A1 | 11/2012 |
| EP | 2797296 A2 | 10/2014 |
| GB | 2008940 A | 6/1979 |
| JP | 2006112523 A | 4/2006 |
| WO | WO 2007/072124 A1 | 6/2007 |
| WO | 2010076639 A2 | 7/2010 |
| WO | 2010/093139 A2 | 8/2010 |
| WO | 2015073020 A1 | 5/2015 |
| WO | WO 2015/147885 A1 | 10/2015 |
| WO | 2015/179257 A1 | 11/2015 |
| WO | 2017087343 A1 | 5/2017 |

OTHER PUBLICATIONS

Non-Final Office Action dated Nov. 3, 2016 from U.S. Appl. No. 14/947,994, 25 pages.

"ASUS Transformer Book Flip TP200SA 360-Degree Convertible Laptop With Quad-core Processor", published Oct. 18, 2015, retrieved from << http://www.tipandtrick.net/asus-transformer-book-flip-tp200sa-360-degree-convertible-laptop-full-review/>> on Oct. 26, 2015, 3 pages.

"BESTEK® 10"-15"Laptop/Notebook Cooling Pad Six-level Changeable Stand with Dual 118mm Hydraulic Fan Dual USB 2.0 360 degree Rotatable Base BTCPZ4BL", published Nov. 20, 2014, retrieved from <<http://www.amazon.com/Notebook-Six-level-Changeable-Hydraulic-Rotatable/dp/B00L8IF6W0>> on Aug. 31, 2015, 5 pages.

"Computex: Asus Transformer Book Flip series launched with 360 Degree Hinge", published Jun. 3, 2014, retrieved from <<http://tech.firstpost.com/news-analysis/computex-asus-transformer-book-flip-series-launched-with-360-degree-hinge-225064.html>> on Aug. 28, 2015, 4 pages.

"HP Spectre introduce hybrid x360 laptop, rotate 360 degrees, $900", published Apr. 25, 2015, retrieved from <<http://sharetech.biz/hp-spectre-introduce-hybrid-x360-laptop-rotate-360-%E2%80%8B%E2%80%8Bdegrees-900/>> on Oct. 26, 2015, 4 pages.

Brown, Mlichael, "Dell targets younger audience with 360-degree laptops and thin, light All-in-One PCs", retrieved from <<http://www.pcworld.com/article/2304649/dell-targets-younger-audience-with-360-degree-laptops-and-thin-light-all-in-one-pcs.htm>>, published Jun. 2, 2014, 7 pages.

Hinckley et al., "Codex: A Dual Screen Tablet Computer", Proceedings of the SIGCHI Conference on Human Factors in Computing Systems, Boston, MA, CHI 2009—New Mobile Interactions, Apr. 9, 2009, pp. 1933-1942, 10 pages.

Kravitz, Noah, "Kyocera Echo Unboxing—Dual-Screen Android Phone (video)", published Apr. 13, 2011, retrieved from <<http://www.technobuffalo.com/videos/kyocera-echo-unboxing-dual-screen-android-phone-video/>> on Oct. 26, 2015, 7 pages.

Pradeep et al., "HP Announces New Pavilion x360 Convertible Laptop Inspired by Lenovo Yoga, Price Starts at $400", published Feb. 23, 2014, retrieved from <<http://microsoft-news.com/hp-

(56) References Cited

OTHER PUBLICATIONS announces-new-pavilion-x360-convertible-laptop-inspired-by-lenovo-yoga-price-starts-at-400/>> on Aug. 28, 2015, 9 pages.
Smith, Daria, "Lenovo's New Flex 3 Convertible Laptops Sport a 360 Degree Hinge", retrieved from <<http://blog.parts-people.com/2015/05/13/lenovos-new-flex-3-convertible-laptops-sport-a-360-degree-hinge/>>, published May 13, 2015, 2 pages.
Smith, Sherri L., "Toshiba Satellite Radius Folds into 5 Different Modes", published May 27, 2014, retrieved at <<http://blog.laptopmag.com/toshiba-satellite-radius-specs-price>> on Sep. 1, 2015, 4 pages.
Villa, Jason de, "iPad mini case review: The best generic case you can get right now", published Jan. 1, 2013, retrieved from <<http://technoodling.net/ipad-mini-case-review-the-best-generic-case-you-can-get-right-now/>> on Aug. 28, 2015, 12 pages.
Response filed Apr. 3, 2017 to the Final Office Action dated Feb. 16, 2017 from U.S. Appl. No. 14/947,994, 9 pages.
Applicant-Initiated Interview Summary dated Apr. 4, 2017 from U.S. Appl. No. 14/947,994, 3 pages.
Restriction Requirement dated Apr. 13, 2017 from U.S. Appl. No. 15/005,976, 5 pages.
Final Office Action dated Feb. 16, 2017 from U.S. Appl. No. 14/947,994, 13 pages.
International Search Report and Written Opinion dated Feb. 20, 2017 from PCT Patent Application No. PCT/US2016/061940, 13 pages.
International Search Report and Written Opinion dated Feb. 16, 2017 from PCT Patent Application No. PCT/US2016/061942, 12 pages.
International Search Report and Written Opinion dated Apr. 21, 2017 from PCT Patent Application No. PCT/US2017/013591, 11 pages.
International Search Report and Written Opinion dated Apr. 21, 2017 from PCT Patent Application No. PCT/US2017/013687, 12 pages.
Response filed Jun. 12, 2017 to the Restriction Requirement dated Apr. 13, 2017 from U.S. Appl. No. 15/005,976, 6 pages.
Non-Final Office Action dated Jul. 17, 2017 from U.S. Appl. No. 14/947,994, 23 pages.
Martin, Harlan, "Geared Hinge", published on Jan. 27, 2015, retrieved at <<https://www.thingiverse.com/make:116451>> on Aug. 9, 2017, 1 page.
Article 34 Amendment and Chapter II Demand filed Jun. 19, 2017 from PCT Patent Application No. PCT/US2016/061940, 21 pages.
Article 34 Amendment and Chapter II Demand filed May 19, 2017 from PCT Patent Application No. PCT/US2016/061942, 14 pages.
Written Opinion dated Sep. 6, 2017 from PCT Patent Application No. PCT/US2016/061940, 9 pages.
"360 deg Hinge Video," published Jul. 21, 2013, retrieved at <<https://www.youtube.com/watch?v=lhEczMi4nsw>> on Aug. 17, 2016, 1 page.
"Acer Unveils Industry's First Convertible Chromebook with 13-inch Display," Aug. 31, 2016, retrieved at <<http://www.acer.com/ac/en/US/press/2016/202372>>, 2 pages.
"Special Purpose Hinges (cont.)," published Jan. 4, 2007, retrieved at <<http://hingedummy.info/specialpurposepage2.htm>> on Aug. 17, 2016, 2 pages.
Domingo, Joel Santo, "Laptop, Tablet or Both? How to Decide," retrieved from <<http://in.pcmag.com/laptops/64076/feature/laptop-tablet-or-both-how-to-decide>>, published May 1, 2014, 11 pages.
Smith, Daria, "Microsoft Helps HP Design New Convertible Spectre x360," published Mar. 3, 2015, retrieved at <<http://blog.parts-people.com/2015/03/03/microsoft-helps-hp-design-ne-convertible-spectre-x360/>>, 1 page.

Wang, Harry, "The 360 Degrees (and 25,000 Hinge Tests) of Yoga Design," Dec. 5, 2012, retrieved at <<http://blog.lenevo.com/en/blog/the-360-degrees-of-yoga-design>>, 14 pages.
"Double geared hinge", retrieved at <<http://www.wamungo.com/PrintModel/Detail/Double-geared-hinge-5305a74589702816c05d1ab5>>, on Mar. 9, 2017, 6 pages.
Written Opinion dated Aug. 24, 2017 from PCT Patent Application No. PCT/US2016/061942, 7 pages.
Final Office Action dated Nov. 2, 2017 from U.S. Appl. No. 14/947,994, 44 pages.
International Preliminary Report on Patentability dated Jan. 23, 2018 from PCT Patent Application No. PCT/US2016/061940, 10 pages.
International Report on Patentability dated Jan. 18, 2018 from PCT Patent Application No. PCT/US2016/061942, 10 pages.
Non-Final Office Action dated Jun. 9, 2017 from U.S. Appl. No. 15/256,302, 17 pages.
"International Preliminary Report on Patentability Issued in PCT Application No. PCT/US2016/061940", dated Jan. 23, 2018, 10 Pages.
"Non Final Office Action issued in U.S. Appl. No. 15/255,056", dated Sep. 28, 2018, 11 Pages.
"Notice of Allowance Issued in U.S. Appl. No. 15/691,524", dated Sep. 24, 2018, 10 Pages.
"International Search Report and Written Opinion Issued in PCT Application No. PCT/US18/034245", dated Aug. 13, 2018, 14 pages.
"Moving Point Hinge—Multipivot Hinge", Retrieved from http://websystem.gismo.se/Gismo/files/1029/2.mph%2001%20introduktion.pdf; Retrieved on Oct. 9, 2014, 6 Pages.
"Non Final Office Action issued in U.S. Appl. No. 14/555,134", dated Apr. 12, 2016, 32 Pages.
"Non Final Office Action issued in U.S. Appl. No. 14/947,994", dated Apr. 5, 2018, 28 Pages.
"Non Final Office Action issued in U.S. Appl. No. 15/239,417", dated May 25, 2017, 71 Pages.
"Non Final Office Action Issued in U.S. Appl. No. 15/256,302", dated May 1, 2018, 9 Pages.
"Non Final Office Action Issued in U.S. Appl. No. 15/374,594", dated Sep. 19, 2017, 11 Pages.
"Final Office Action Issued in U.S. Appl. No. 15/414,432", dated May 17, 2018, 9 Pages.
"Non Final Office Action issued in U.S. Appl. No. 15/414,432", dated Nov. 29, 2017, 10 Pages.
Elliot, Amy-Mae, "9 Nifty Laptop Feet to Keep Your PC Running Cool", Retrieved from https://mashable.com/2012/07/30/laptop-feet/#norOLvMOFagy, Jul. 30, 2012, 26 Pages.
"International PreliminaryPreliminaryReport on Patentability Issued in PCT Application No. PCT/US2015/060959", dated Mar. 3, 2017, 7 Pages.
"International Search Report & Written Opinion Issued in PCT Application No. PCT/US2015/060959", dated Jan. 25, 2016, 11 Pages.
"Second Written Opinion issued in PCT Application No. PCT/US2015/060959", dated Oct. 10, 2016, 7 Pages.
"International Search Report & Written Opinion Issued in PCT Application No. PCT/US2018/013036", dated Apr. 6, 2018, 11 Pages.
"Final Office Action Issued in U.S. Appl. No. 15/256,302", dated Oct. 17, 2018, 12 Pages.
"International Search Report & Written Opinion Issued in PCT Application No. PCT/US18/034011", dated Nov. 16, 2018, 13 Pages.

* cited by examiner

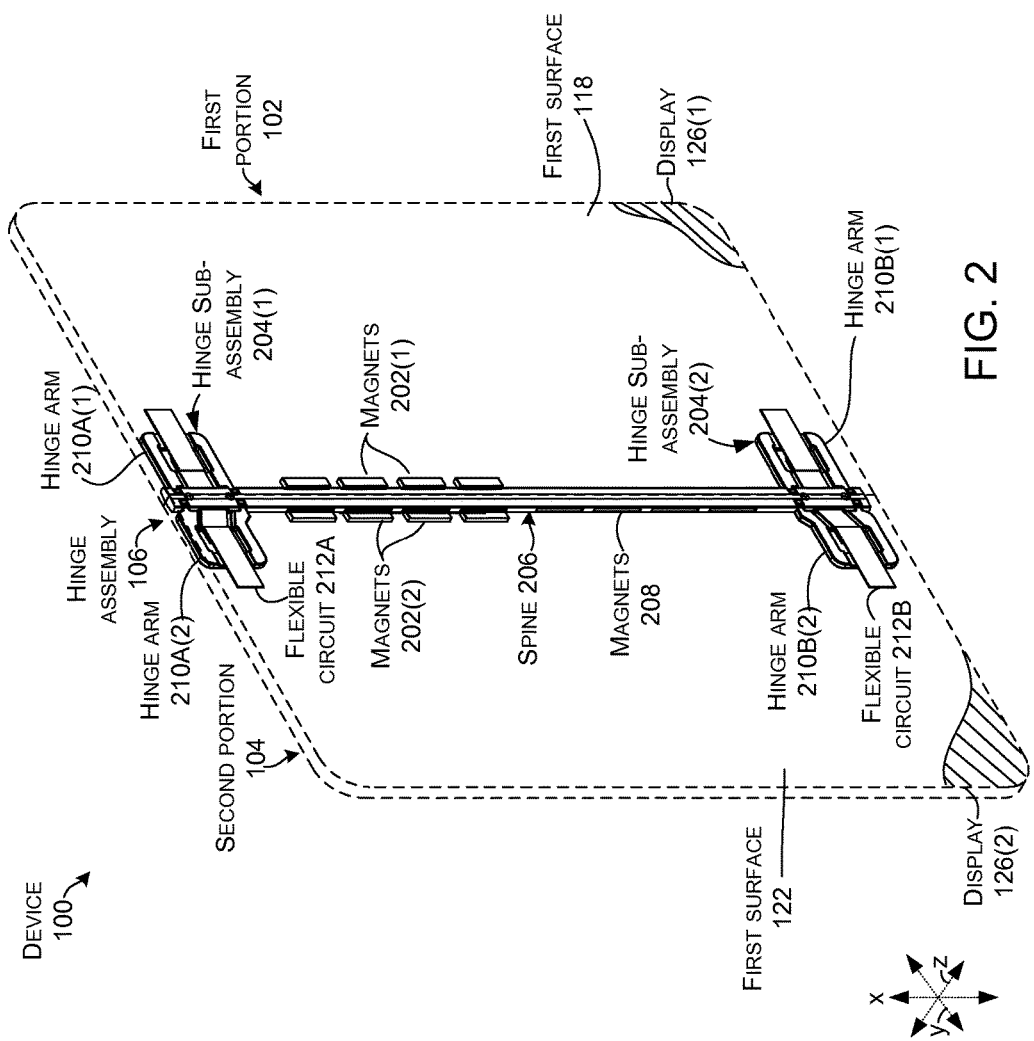

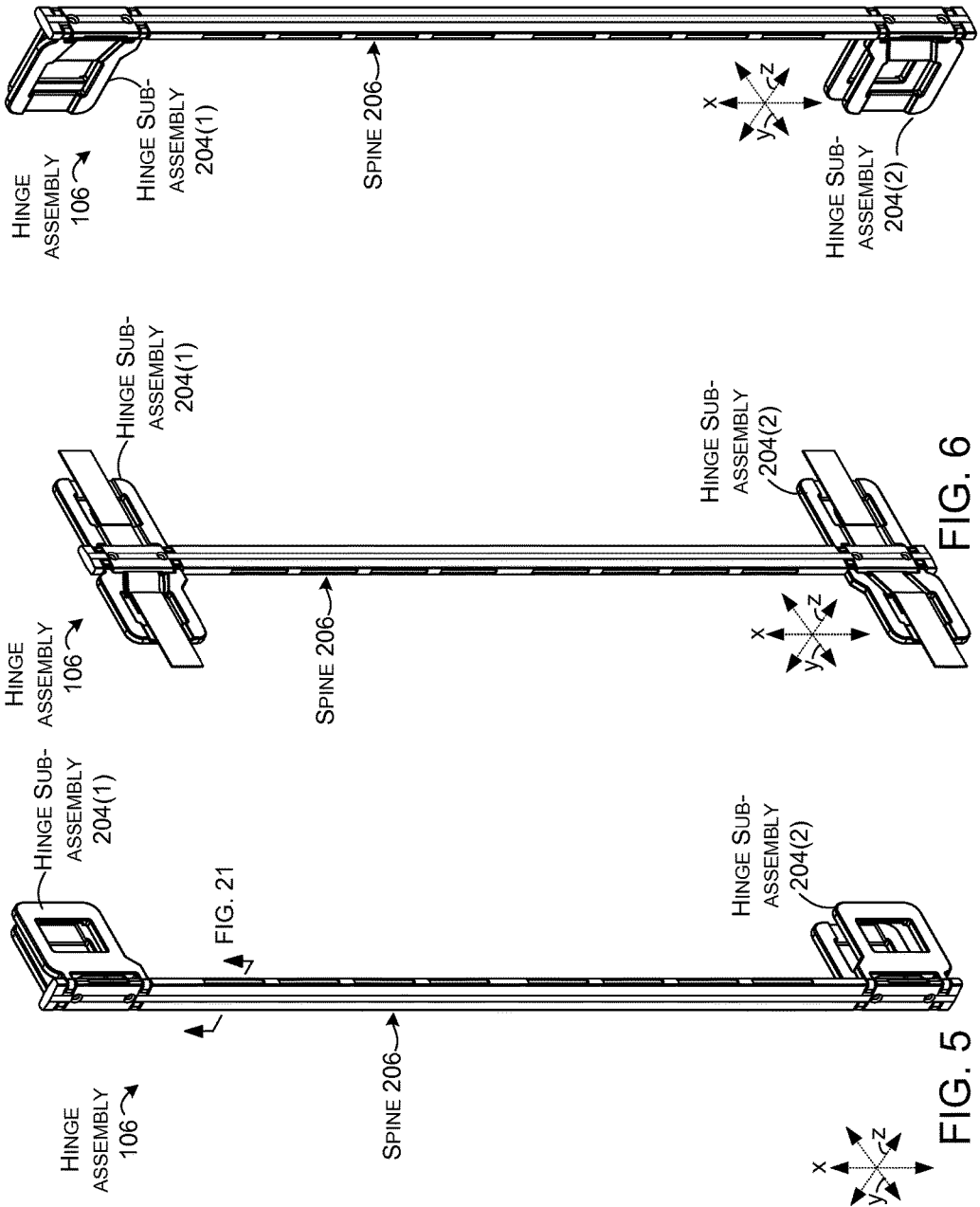

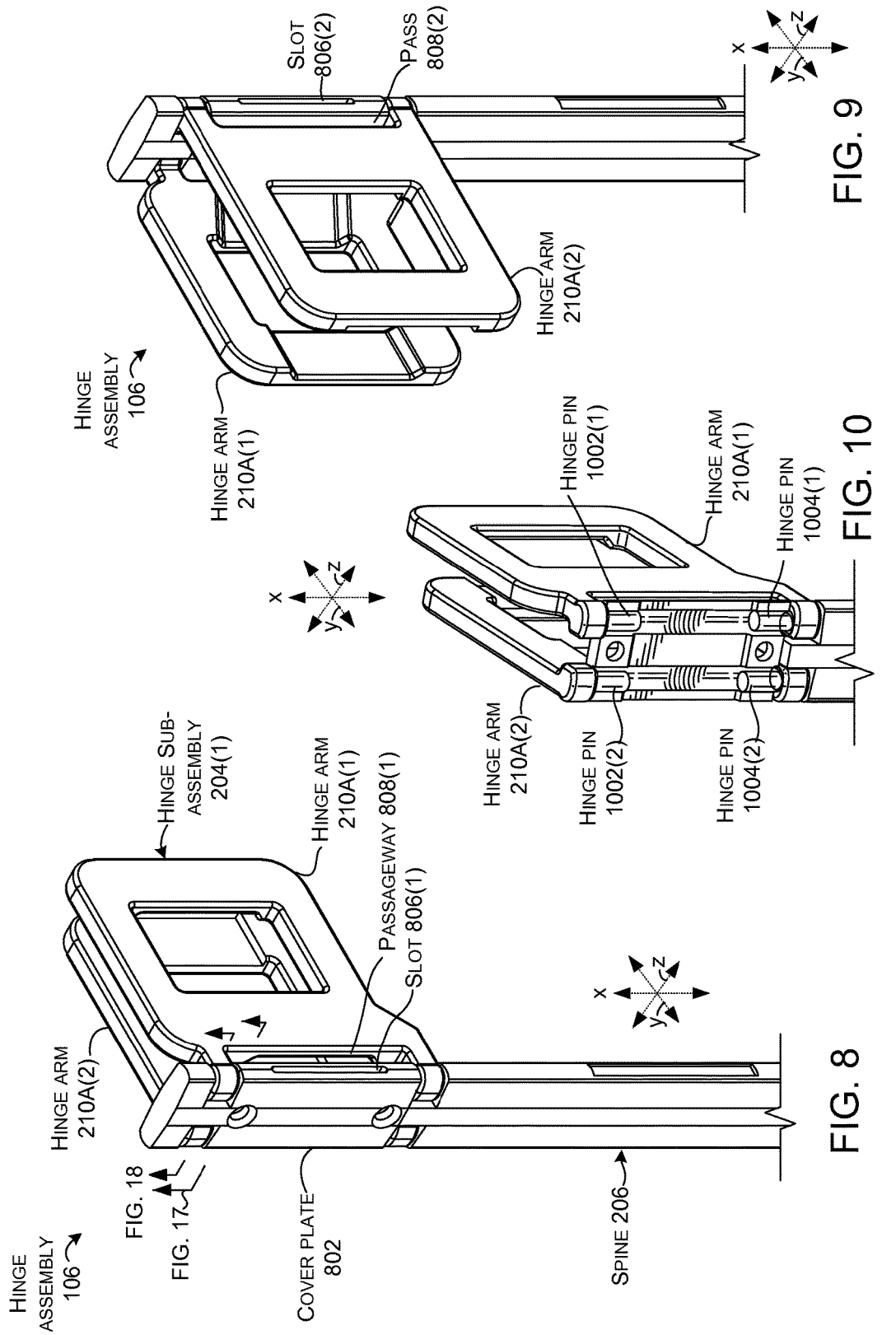

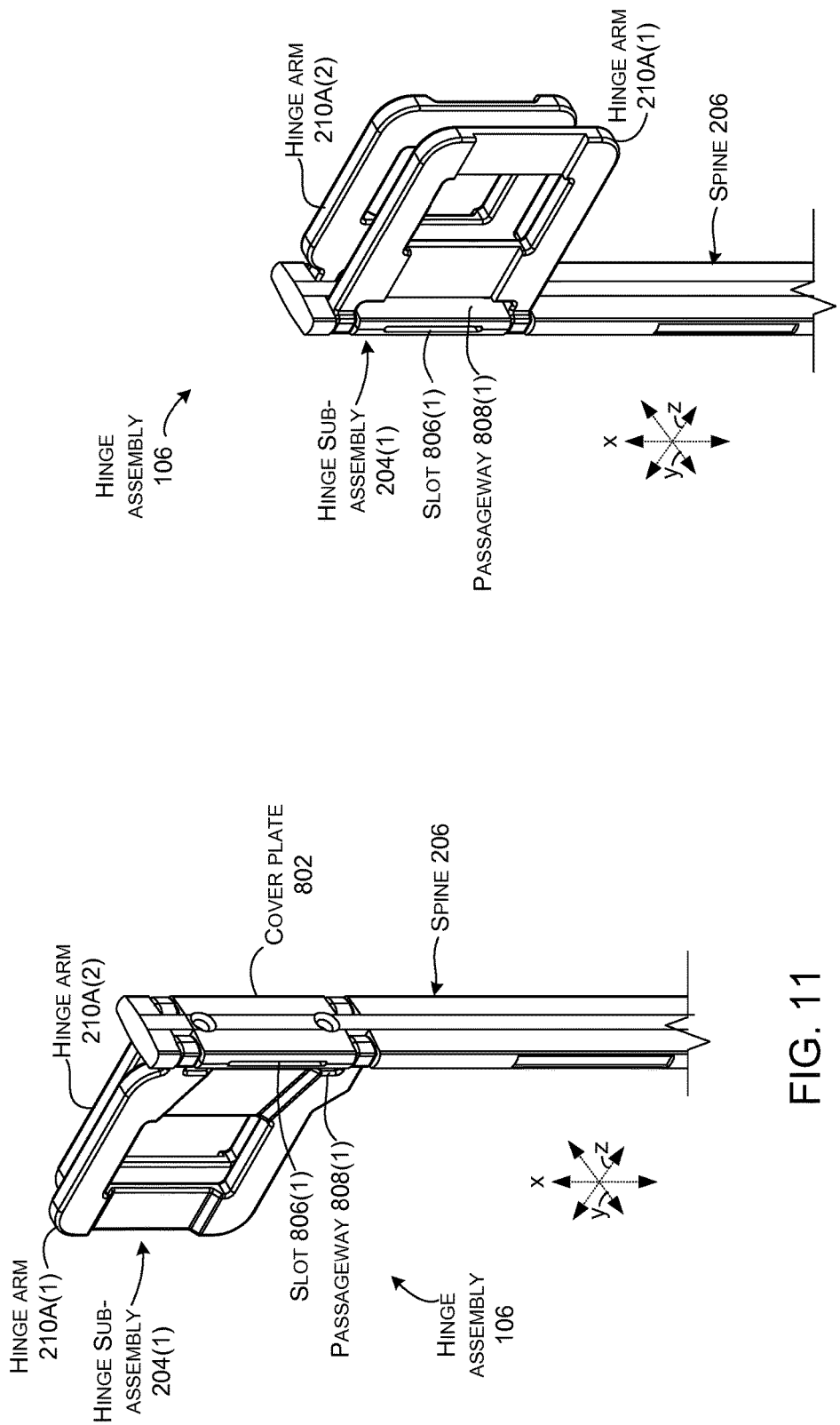

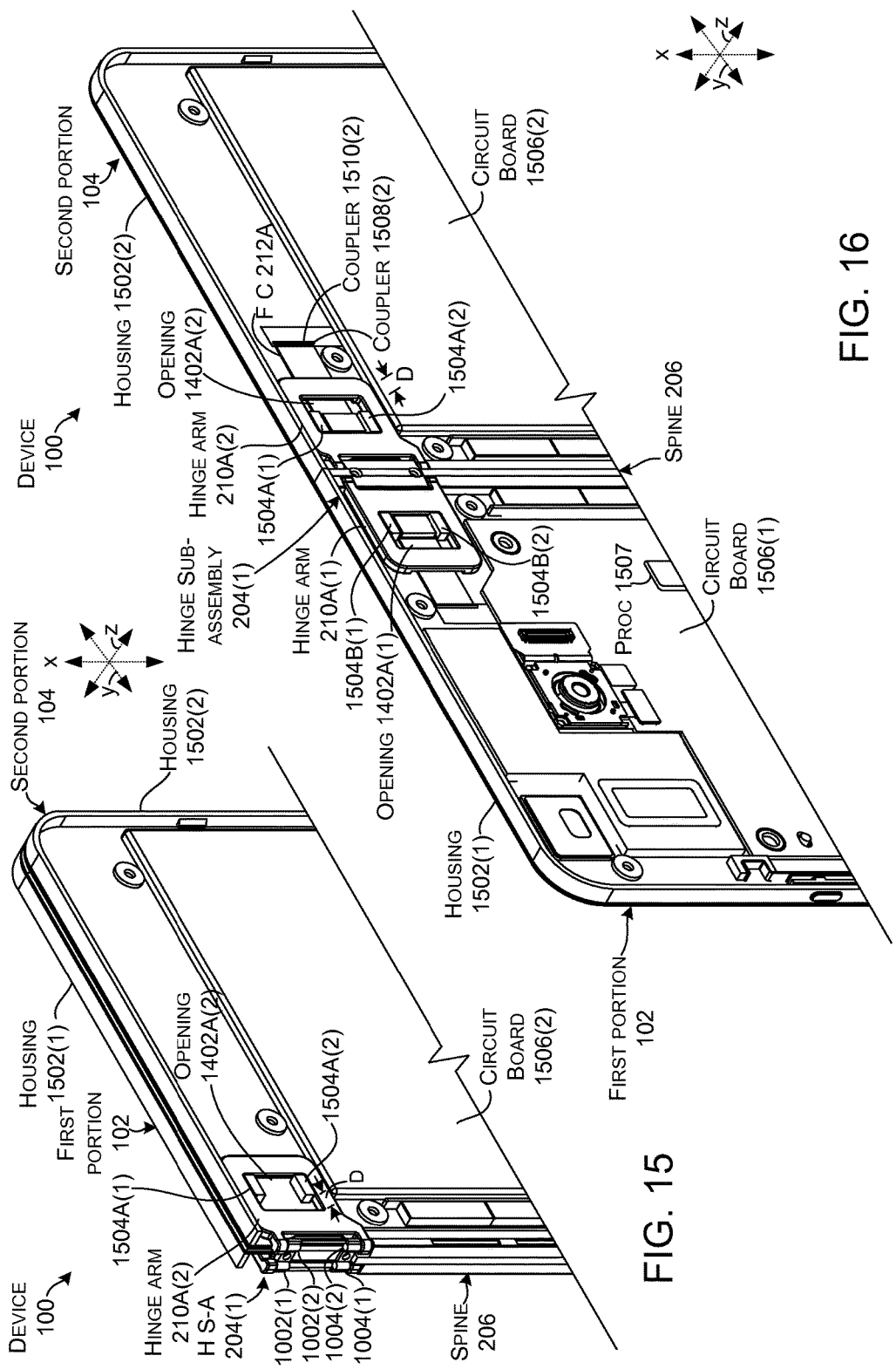

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1-4 and 15-16 show perspective views of example devices in accordance with some implementations of the present concepts.

FIGS. 5-14 show perspective views of hinge assembly examples in accordance with some implementations of the present concepts.

DESCRIPTION

The present concepts relate to devices, such as computing devices employing recessable hinge assemblies that can rotationally secure two device portions. The recessable hinge assemblies can also bias the device portions to specific orientations, such as closed and open orientations. In the open orientation the hinge assembly can be configured to allow the device portions to abut one another to create a near seamless display area across the device portions.

Figure 1:
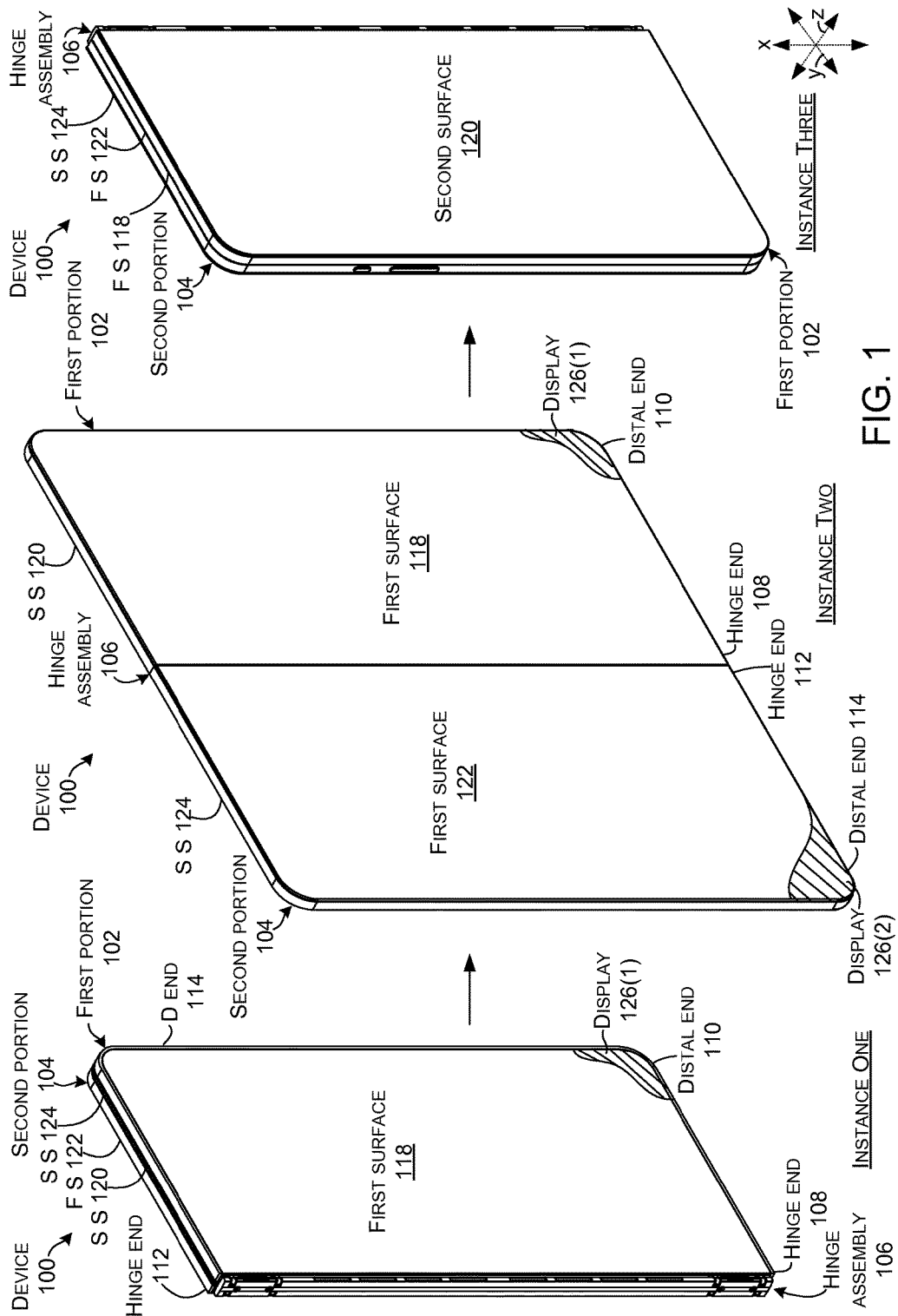

Introductory FIG. 1 shows an example device 100. In this example, the device 100 has first and second portions 102 and 104 that are rotatably secured together by a hinge assembly 106. The first portion 102 can extend from a hinge end 108 to a distal end 110. The second portion 104 can extend from a hinge end 112 to a distal end 114. The first portion can include opposing first and second major surfaces 118 and 120 (hereinafter, first and second surfaces). Similarly, the second portion can include opposing first and second major surfaces 122 and 124 (hereinafter, first and second surfaces).

Instance One shows device 100 in a closed orientation. The closed orientation can be viewed as defining a near zero degree angle between the first and second portions as measured relative to the hinge assembly 106.

Instance Two shows second portion 104 rotated 180 degrees counter-clockwise from Instance One so that the device is now in a fully open orientation (e.g. at 180 degrees), and the first portion 102 and the second portion 104 are adjacent and coplanar. Thus, if displays 126(1) and 126(2) (shown partially) are employed on the first surfaces 118 and 122, in the fully open position these displays can be addressed (e.g., treated) as a single display with larger (e.g. 2x) dimensions.

Instance Three shows first portion 102 rotated 180 degrees clock-wise so that the device is now again in the closed orientation except that now the displays 126 are inward facing and positioned against one another and are protected by the first and second portions 102 and 104. Rather than referring to this as zero degrees, this configuration can be viewed as 360 degrees since in Instance One, the second surfaces 120 and 124 were positioned against one another and the first surfaces 118 and 122 were outwardly facing. Now the first surfaces 118 and 122 are positioned against one another and the second surfaces 120 and 124 are outwardly facing.

As mentioned above, in some configurations, the first surfaces 118 and 122 can be manifest as displays 126, such that in the fully open orientation of Instance Two the displays can work cooperatively to create a larger (e.g., 2x) display area. In some cases, the second surfaces 120 and 124 can be manifest as protective covers so that in the configuration of Instance One, the protective covers protect the displays of the first surfaces. In other configurations, both the first and second surfaces can be displays, or neither can be displays.

Figure 4:
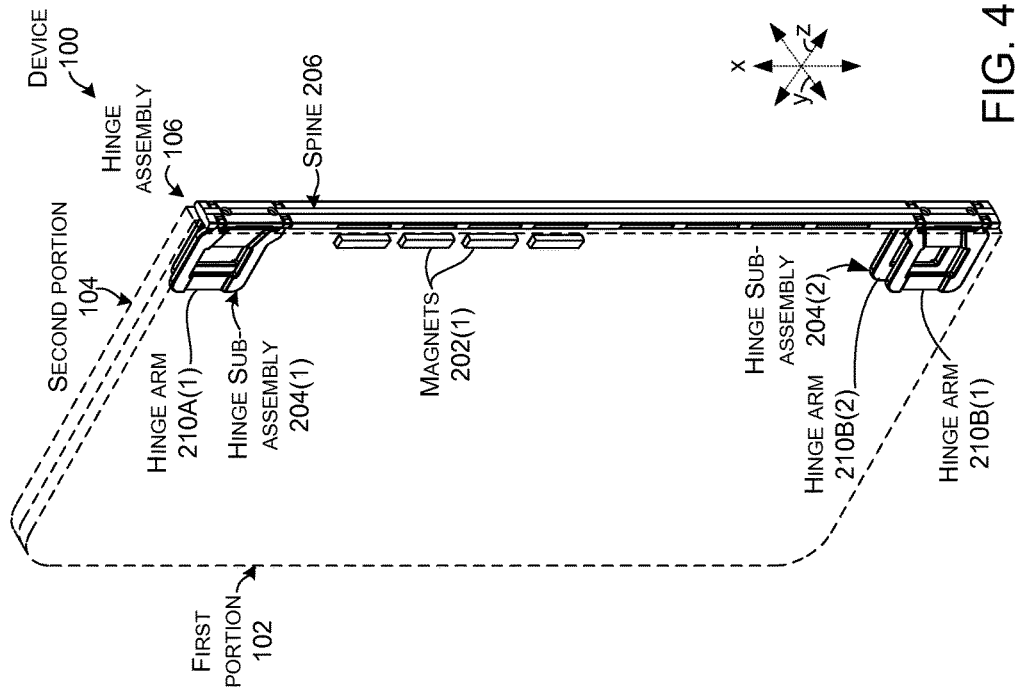
Figure 3:
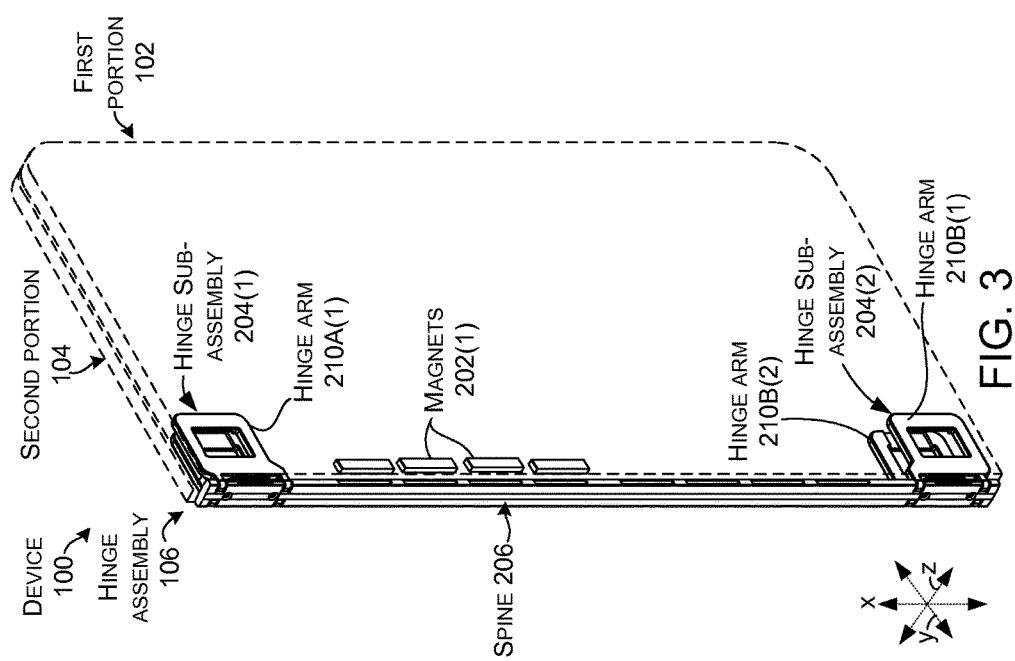

FIGS. 2-4 show the first and second portions 102 and 104 in ghost so that underlying components can be visualized. Magnets 202(1) are contained in the first portion. Note that not all of these magnets are shown so that other components can be distinguished. The function of these magnets is explained below relative to FIG. 21.

As shown in FIGS. 2-7 hinge assembly 106 includes a first hinge sub-assembly 204(1) and a second hinge sub-assembly 204(2). A spine 206 extends between the first hinge assembly and the second hinge assembly. The spine can provide structural support to the hinge assembly. Further, the spine can include magnets 208. The magnets 208 can interact with the magnets 202 to predispose the device into specific angles, such as zero, 180, and/or 360 degrees, among others. This aspect is discussed in more detail below relative to FIG. 21.

First and second hinge sub-assemblies 204(1) and 204(2) can include first and second hinge arms 210A(1) and 210A(2) and 210B(1) and 210B(2). As shown in FIG. 2, a flexible circuit 212 (such as a flexible printed circuit (FPC)) can pass through one or both of the hinge sub-assemblies 204. In this case, first flexible circuit 212A passes through the first hinge sub-assembly 204(1) and second flexible circuit 212B passes through second hinge sub-assembly 204(2).

FIGS. 5-7 show the hinge assemblies in isolation in views similar to those of FIGS. 3, 2, and 4, respectively.

FIGS. 8-14 show enlarged views of first hinge sub-assembly 204(1) and a portion of spine 206. In this implementation, a cover plate 802 (removed FIG. 10 to show underlying structures) and spine 206 cooperatively define opposing slots 806(1) and 806(2) (FIGS. 8-9) through which flexible circuit 212A (FIGS. 13-14) can pass. The slots 806 are aligned with passageways 808 (FIGS. 8-9) defined between the hinge arms 210A and the spine 206. The slots 806 and the passageways 808 can protect the flexible circuits 212A (FIGS. 13-16) passing from one device portion to the other (e.g., from first portion 102 to second portion 104 as seen in FIG. 2). Thus, through the range of rotations, the flexible circuits are protected by and mostly or fully covered by the spine 206 and hinge arms 210A.

In this implementation, cover plate 802 helps to secure the hinge arms 210A to the spine 206. FIG. 10 shows the cover plate removed so that upwardly and downwardly facing hinge pins 1002 and 1004 of the hinge arms can be visualized. The hinge pins 1002 and 1004 operate cooperatively with the cover plate 802 and the spine 206 to define a rotational path of the hinge arms 210A. Stated another way, each pair of upwardly and downwardly facing hinge pins (e.g., hinge pins 1002(1) and 1004(1) define an axis of rotation for hinge arm 210A(1) and hinge pins 1002(2) and 1004(2) define an axis of rotation for hinge arm 210A(2). The hinge pins may also move laterally during this rotation. This aspect is described in more detail below relative to FIGS. 17-19.

Figure 14:
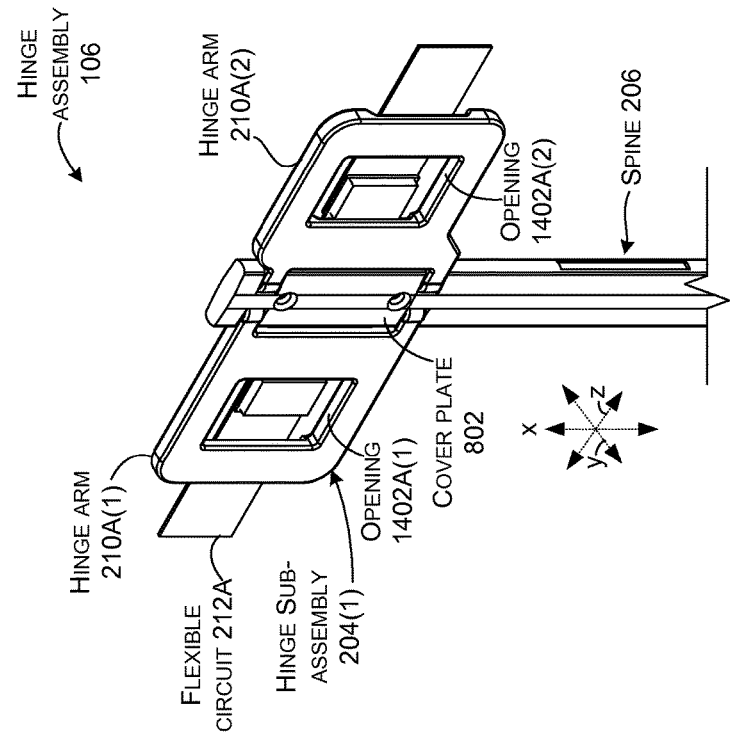
Figure 13:
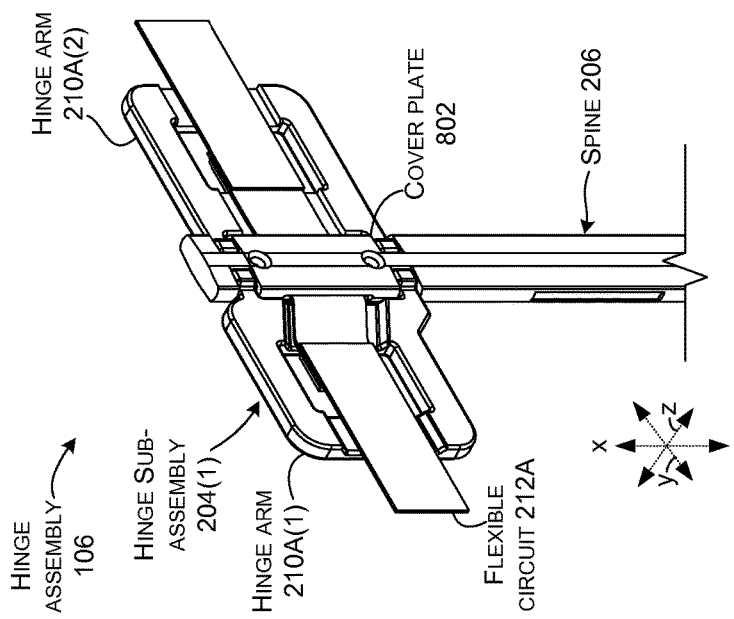

Note also, as labeled relative to FIG. 14, the hinge arms 210A define openings 1402A(1) and 1402A(2). The function of the openings is described below relative to FIG. 15.

FIGS. 15 and 16 show views of device 100 that are similar to Instance One and Instance Two of FIG. 1. In this case, the first surfaces are removed. In FIGS. 15 and 16, the second surfaces 120 and 124 of the first portion 102 and the second portion 104, respectively, are defined by a frame or housing 1502(1) on the first portion and another frame or housing 1502(2) on the second portion. The hinge arms can be slideably secured to the housing 1502. In this case, the housing 1502 includes two pairs of spaced apart rails 1504A. An outer surface of the pairs of rails corresponds to an inner surface of openings 1402A in the hinge arms 210A. The hinge arms are retained in the z-reference direction between the housing 1502 and the first surfaces (not shown). However, the hinge arms can slide in the y-reference direction for a distance D defined by the inter-relation of the pairs of rails 1504A and the openings 1402A. Mechanically, this sliding of the hinge arms can contribute to the device having a wide range of rotations (e.g., 360 degrees of rotation) and to the first and second portions directly abutting one another in the fully open (e.g. 180 degree) orientation of FIG. 16.

Several electronic components, such as circuit boards 1506(1) and 1506(2), a processor 1507, and/or storage/memory (not specifically designated) can be secured to the housings 1502(1) and 1502(2), respectively. The flexible circuit 212A (shown in FIG. 16., removed in FIG. 15) can be electrically coupled to these electronic components. In this case, the ends of the flexible circuit can include couplers 1508 that can be readily received by corresponding couplers 1510 on the housing (e.g., the flexible circuit couplers 1508 can snap into the corresponding couplers 1510) to quickly electrically couple the two device portions. Due to space constraints, the couplers are only labeled relative to second portion 104.

The processor 1507 can generate graphical user interfaces (GUIs) for presentation on the displays (126, FIG. 1). In some implementations, the processor may generate different GUIs for the displays when the first and second portions 102 and 104 are in some orientations and a single GUI for a combined presentation in other orientations. For instance, when the first and second portions are oriented at 90 degrees relative to one another, the processor may generate a first GUI for presentation on the first portion and a second GUI for presentation on the second portion. When the first and second portions are oriented to 180 degrees, the processor can generate a single GUI that is collectively presented across both displays to create a larger display area.

Note that in FIG. 15 where the device is closed (e.g., at zero degrees or at 360 degrees), the hinge arm 210A(2) has moved fully to the left (e.g., in the negative y-reference direction) relative to pair of rails 1504A(1) and 1504A(2). This allows the hinges to operate and allow rotation of device portions 102 and 104 to acute angles (e.g., toward zero and toward 360). In contrast, in the fully open orientation of FIG. 16, the hinge arm 210A(2) has moved fully to the right (e.g., in the positive y-reference direction) relative to pair of rails 1504A(1) and 1504A(2). This orientation allows the first and second portions 102 and 104 to abut directly against one another with no (or little) gap in between. Stated another way, in the fully open orientation of FIG. 16, the spine 206 and the hinge axes (defined by hinge pins (cover plate removed and labeled in FIG. 15)) are contained within the first and/or second portions 102 and 104.

Recall that as mentioned above relative to FIGS. 8-10, the cover plate 802 and spine 206 also cooperatively define opposing slots 806(1) and 806(2) (FIGS. 8-9) through which flexible circuit 212A can pass. The slots are aligned with passageways 808 (FIGS. 8-9) defined between the hinge arms 210A and the spine 206. The slots 806 and the passageways 808 can protect the flexible circuits passing from one device portion to the other. Thus, through the range of rotations, the flexible circuits are protected by and mostly or fully covered by the spine 206 and hinge arms 210A. As shown in FIGS. 15 and 16, the slideable attachment of the hinge arms 210A when combined with the slots 806 and passageways 808 of FIGS. 8-9 can allow the flexible circuit 212A to be protected by the hinge sub-assembly 204(1) when rotated through a range of orientations from 0 degrees to 360 degrees.

Figure 17:
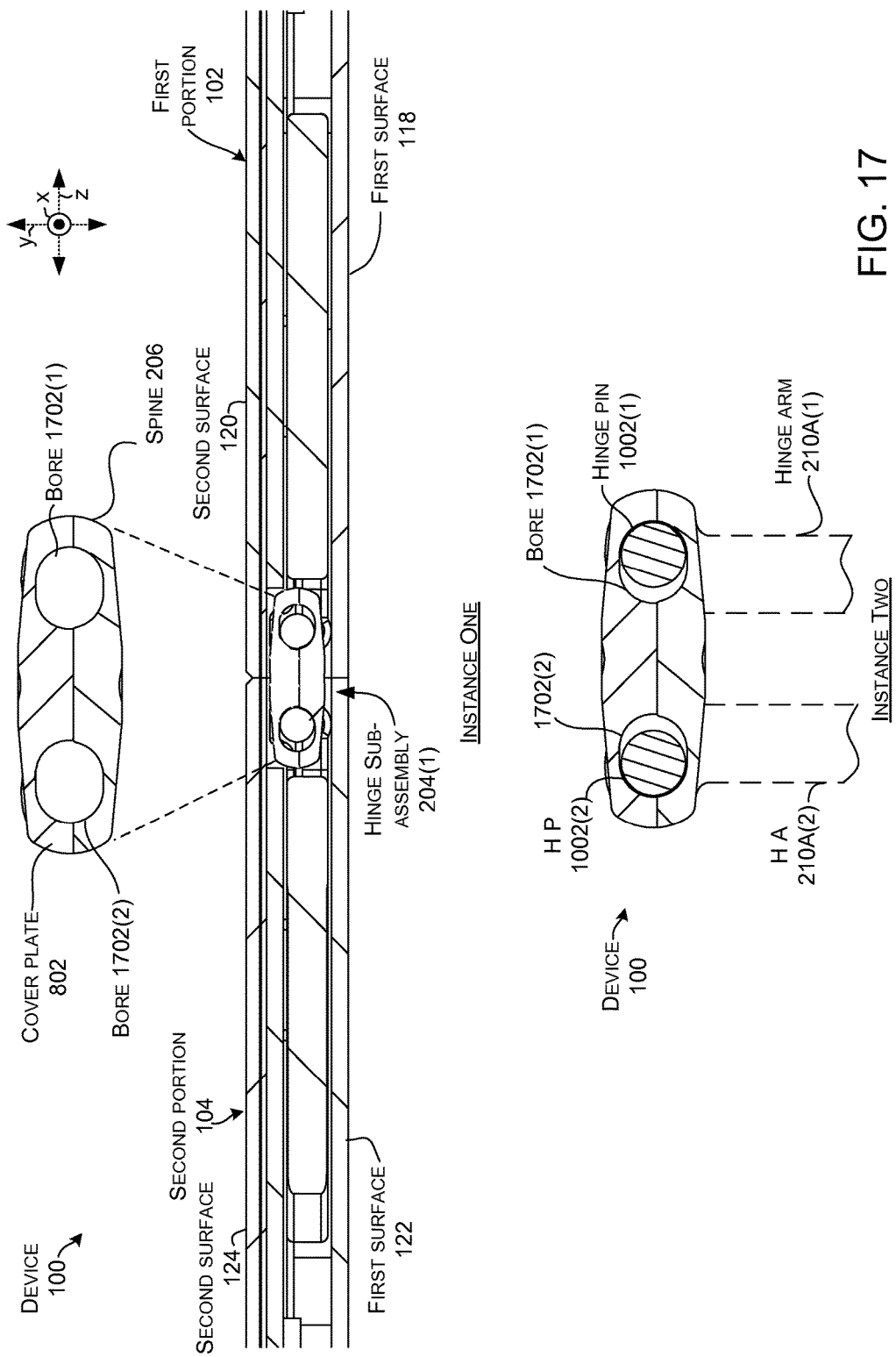
FIGS. 17-23 show sectional views of hinge assembly examples in accordance with some implementations of the present concepts.

FIG. 17 shows a sectional view of device 100 along the yz-reference plane as indicated in FIG. 8. Instance One shows oval hinge bores 1702(1) and 1702(2) formed by the cover plate 802 and the spine 206. Instance Two shows hinge pins 1002(1) and 1002(2) of hinge arms 210A(1) and 210A(2) (shown in ghost). The hinge pins 1002 are positioned in the oval hinge bores 1702(1) and 1702(2). The oval hinge bores allow lateral movements of the hinge pins (e.g., in the z-reference direction) during rotation of the hinge arms (and hence the device portions) around the hinge pins.

Figure 18:
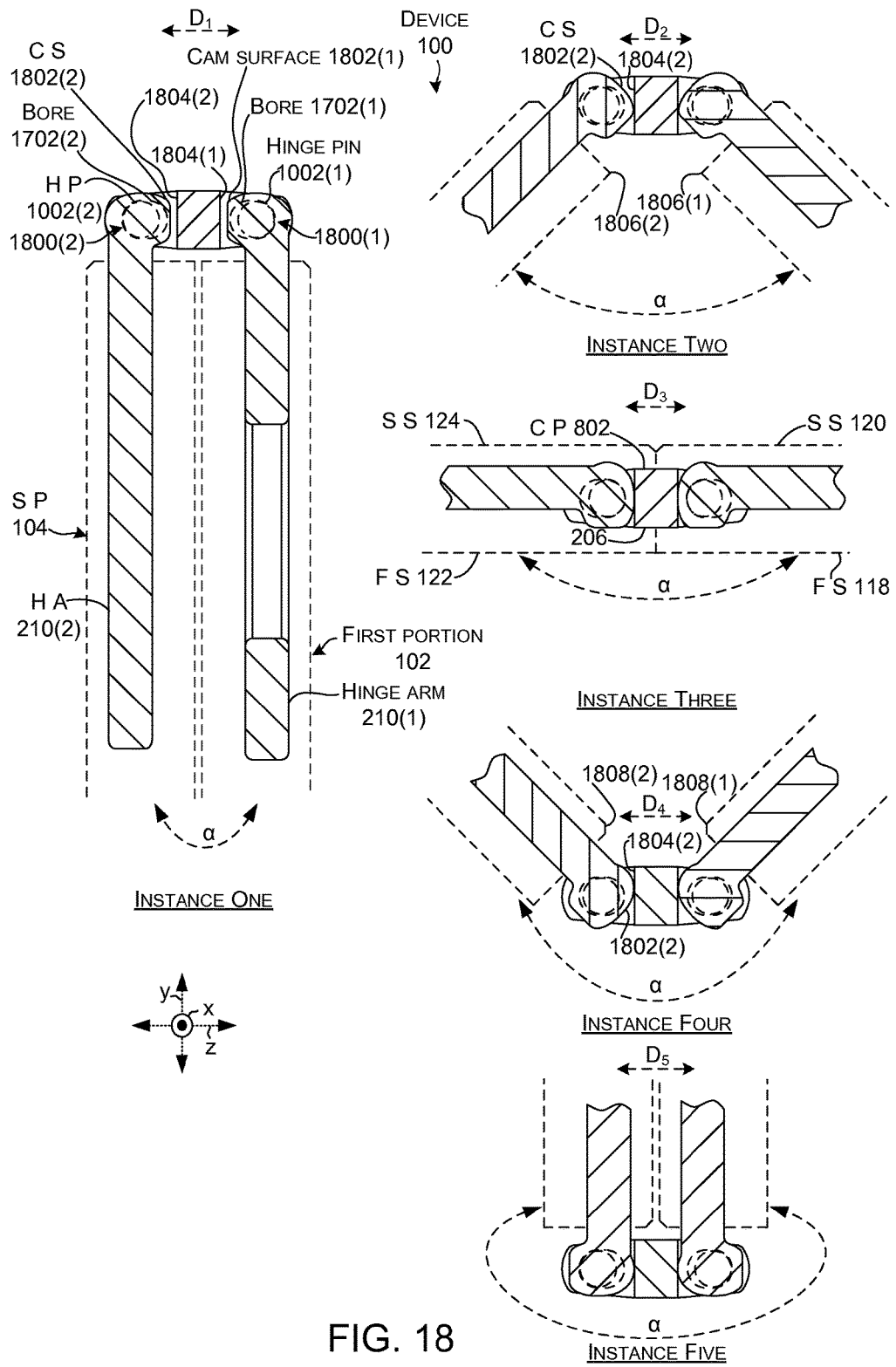

FIG. 18 shows a sectional view of device 100 along the yz-reference plane as indicated in FIG. 8. Instance One shows hinge pins 1002(1) and 1002(2) in oval hinge bores 1702(1) and 1702(2). Hinge pins 1002(1) and 1002(2) are associated with hinge arms 210A(1) and 210A(2), respectively. The hinge arms 210A(1) and 210A(2) are associated with first and second portions 102 and 104 (shown in ghost), respectively. Note that at this point, the first and second portions 102 and 104 are parallel to one another in a closed position (e.g., defining a zero degree angle α there between).

FIG. 18 introduces cams 1800(1) and 1800(2) that control distance D between the hinge arms 210A during rotation. In this case, the cams are manifest as cam surfaces 1802 and 1804. Cam surfaces 1802 are defined by the hinge arms 210A and cam surfaces 1804 are defined by the spine 206 and cover plate 802 (labeled in Instance Three).

Figure 19:
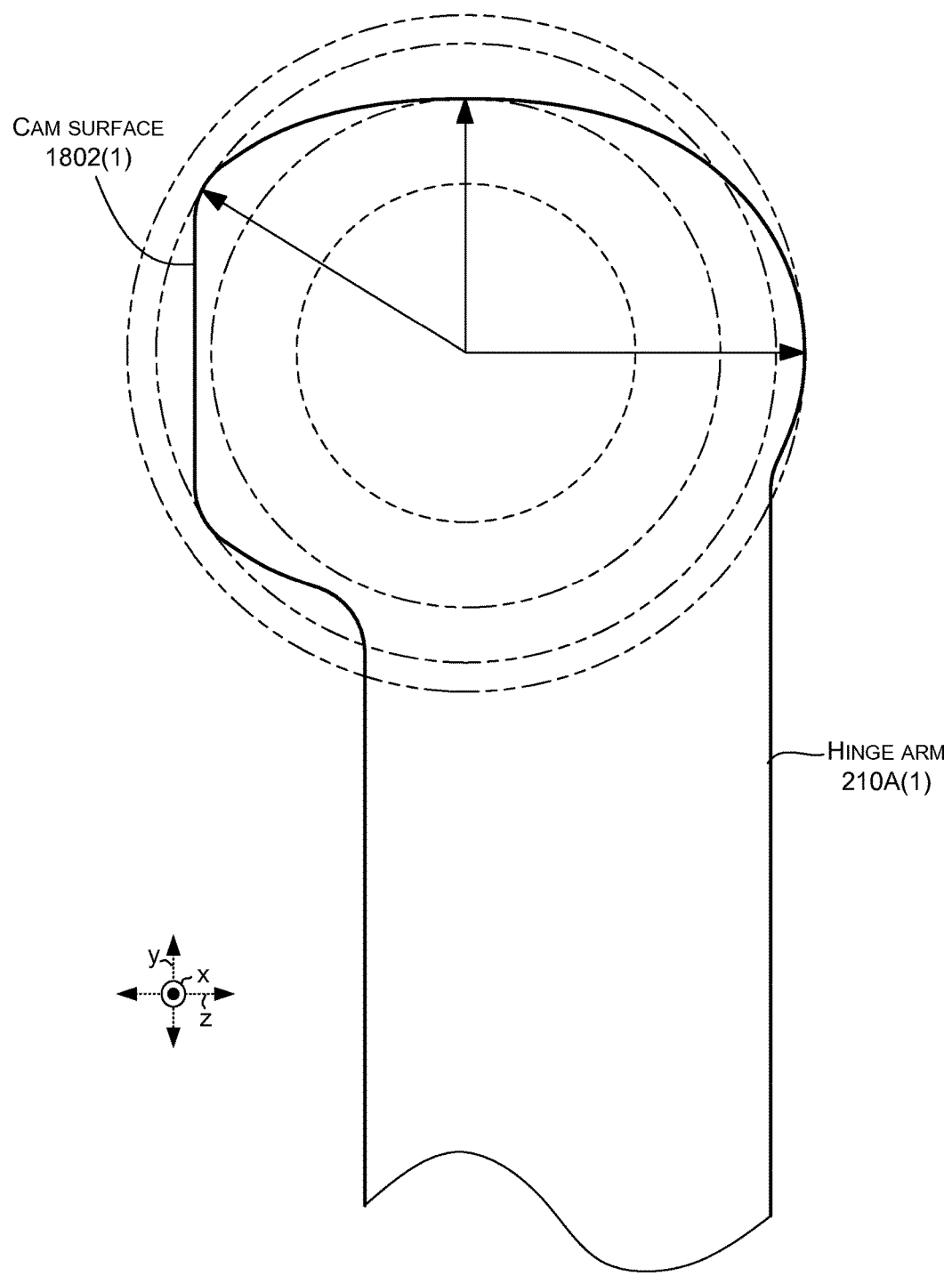

Instance One shows first cam surfaces 1802 on the hinge arms 210A and second cam surfaces 1804 on the spine and cover plate. The interrelationships of the cam surfaces 1802 and 1804 and the hinge pins 1002 in oval hinge bores 1702 control relative spacing of the hinge arms during opening and closing. In the closed position of Instance One, the hinge pins 1002 are spaced as far apart from one another as the oval hinge bores allow (e.g., represented by hinge pin to hinge pin distance $D_1$). Further, the cam surfaces 1802 and 1804 are not engaging one another. (FIG. 19 shows an enlarged view of cam surfaces 1802(1) on hinge arm 210A (1)).

Instance Two shows the device 100 at a point where the user has opened the first and second portions 102 and 104 until angle α is about 90 degrees. At this point in the rotation, the shape of cam surface 1802 causes cam surfaces 1802 and 1804 to engage one another, which maintains spacing ($D_2$) between hinge pins 1002(1) and 1002(2). This cam action also spaces inner corners 1806(1) and 1806(2) of the first and second portions 102 and 104 from one another. This feature can prevent the first and second portions from striking each other at the inner corners 1806 and causing damage during rotation. For instance, the first and second portions might be covered with glass displays which if they struck each other could cause damage, such as chipping. This feature reduces/eliminates this risk of damage.

Figure 20:
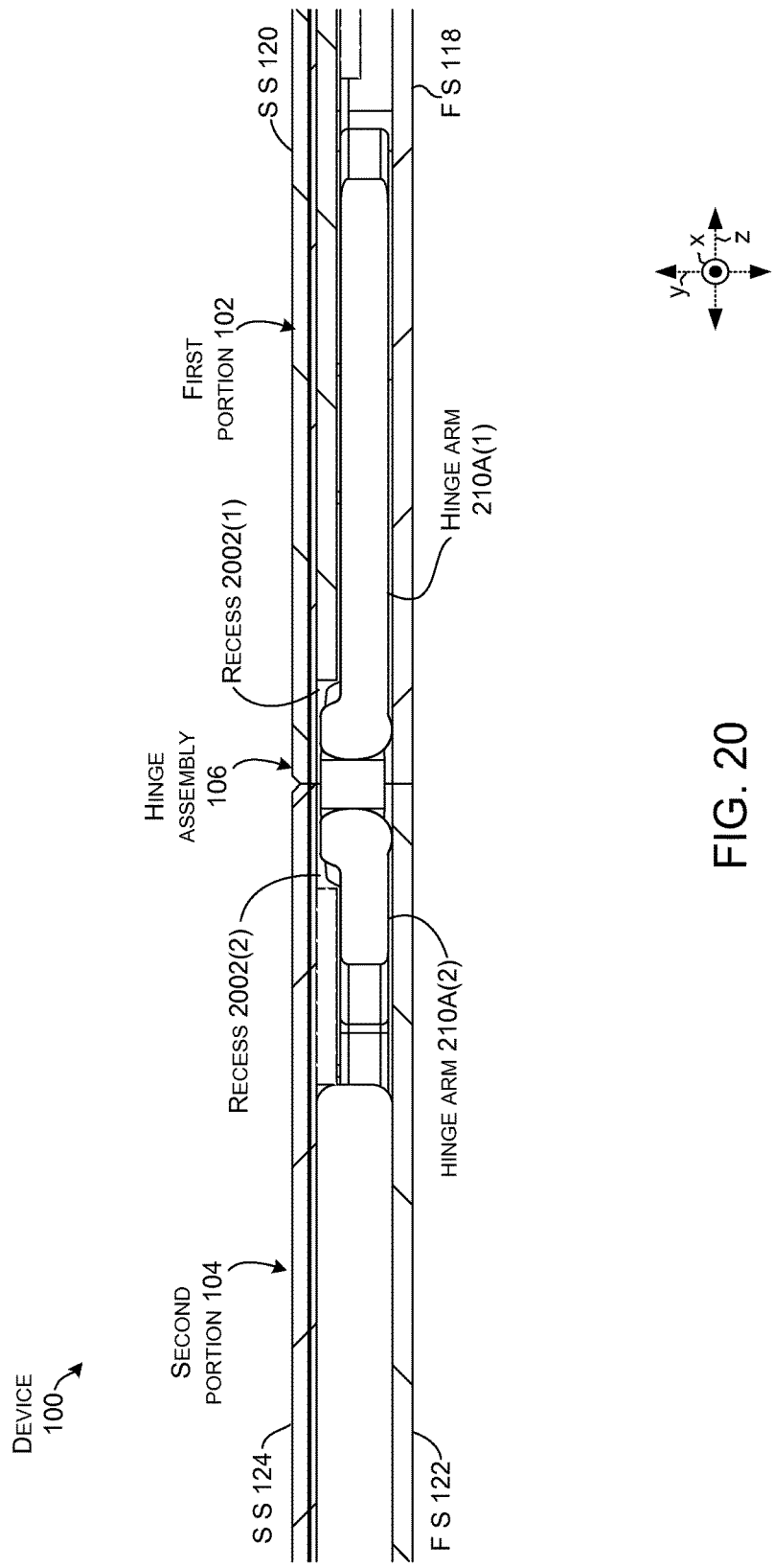

Instance Three shows device 100 rotated until the first and second portions are coplanar (e.g., angle α is 180 degrees). At this point, the shape of cam surface 1802 allows the first and second portions to move toward one another (e.g., distance $D_3$ is less than distances $D_1$ and/or $D_2$. In this case, the first and second portions are coplanar and abutting one another. Thus, in an implementation where displays (126, FIG. 1) are employed on first surfaces 118 and 122 and/or second surfaces 120 and 124, a large (e.g. 2×) nearly seamless display area can be created. Further details of device 100 in the fully open configuration are illustrated in FIG. 20.

Instance Four shows continued rotation so that angle α is about 270 degrees. At this point, the shape of cam surface 1802 causes this cam surface to engage cam surface 1804 to force the hinge pins 1002 apart to protect inner corners 1808(1) and 1808(2). Thus, distance $D_4$ is larger than $D_3$ and about the same as $D_2$.

Instance Five shows the first and second portions 102 and 104 parallel to one another and about 360 degrees from the orientation of Instance One.

Thus, the cams 1800 can bring the hinge end of the first portion 102 and the hinge end of the second portion 104 toward one another when the device is opened, such as going from Instance One where the first and second portions are adjacent and coplanar to Instance Two where the first and second portions define a right angle or an oblique angle. During this rotation, the cams 1800 can extend the hinge end of the first portion and the hinge end of the second portion away from one another to protect the inner corners 1808.

FIG. 19 shows details of the shape of camming surface 1802(1) of hinge arm 210A(1) as mentioned above relative to FIG. 18.

FIG. 20 shows details of device 100 in the fully open configuration (in this case 180 degrees) mentioned above relative to Instance Three of FIG. 18. Further, FIG. 20 shows recesses 2002(1) and 2002(2) that are occupied by the hinge assembly 106 when the device is in the fully open configuration as the hinge arms 210A slide into the device portions as mentioned relative to FIG. 16. For instance, hinge arm 210A(2) slides in the negative z-reference direction into first portion 102 and hinge arm 210A(1) slides in the positive z-reference direction into second portion 104. The hinge assembly 106 sliding into recesses 2002(1) and 2002(2) can allow surfaces 118 and 122 and 120 and 124 to abut one another. In one configuration, the first surfaces 118 and 122 can be manifest as displays so that a single graphical user interface can be collectively presented across both displays to effectively double the display area. The second surfaces 120 and 124 can alternatively or additionally be manifest as displays that receive another graphical user interface for collective presentation.

Figure 21:
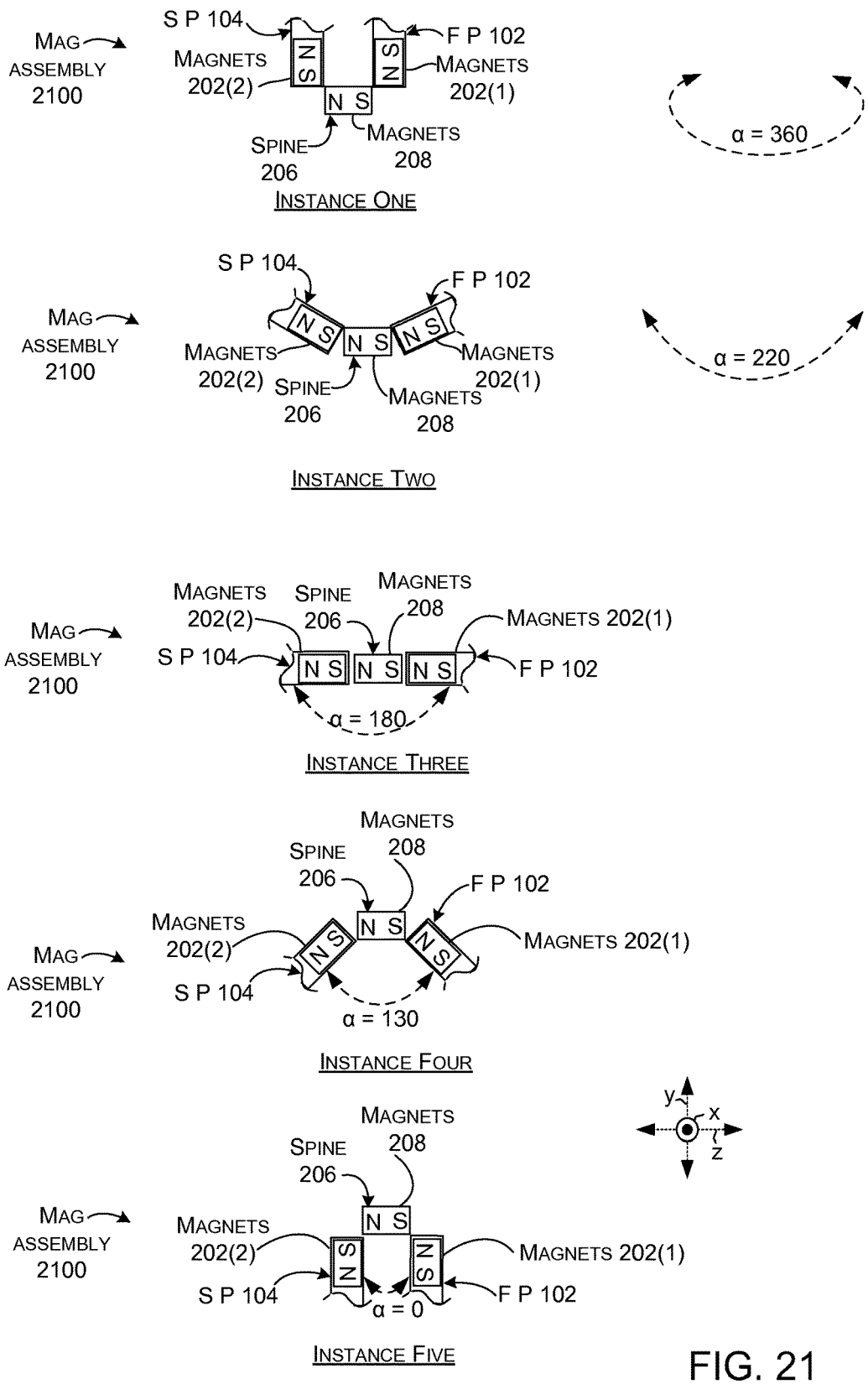

Recall that FIG. 18 shows how the first portion 102 and second portion 104 can be rotated from zero degrees to 360 degrees. FIG. 21 shows how the device can impart forces on the first and second portions to bias the first and second portions toward specific relative angular orientations.

FIG. 21 is a sectional view as indicated in FIG. 5. FIG. 21 shows how magnets 202(1), 202(2), and 208 can operate cooperatively to create forces that bias the device portions 102 and 104 toward specific orientations. Thus, from one perspective, magnets 202(1), 202(2), and 208 can be thought of as a magnetic assembly 2100 that is configured to bias the first and second portions to specific angular orientations or configurations.

Instance One shows the device portions 102 and 104 in a closed configuration (e.g., angle α is 360 degrees) where the portions overlay one another. Magnets 202(1) and 202(2) interact (e.g., attract one another) to create a bias toward this closed configuration. For instance, the North (N) pole of magnet 202(2) is positioned proximate to the South (S) pole of magnet 202(1) and the North Pole of magnet 202(1) is positioned proximate to the South Pole of magnet 202(2). The attraction between the magnets creates a force holding the first and second portions in this closed configuration. A user can apply a greater force to overcome the magnetic force and open the device.

Instance Two shows the device opened to about 220 degrees, which can be termed an intervening orientation (e.g., between closed and fully open). At this point magnetic attraction between the magnets 202 in the first and second portions 102 and 104 and magnets 208 in the spine 206 create a force that biases the device to continue to open. Specifically, the force between magnets 202(1) and 202(2) is diminished compared to Instance One, but the attractive force between magnet 202(2) and magnet 208 and magnet 208 and magnet 202(1) is increasing. In Instance Two, the South Pole of magnet 202(2) is attracted to the North Pole of magnet 208 of spine 206. The South Pole of magnet 208 is attracted to the North Pole of magnet 202(1). This attraction can bias the device into the fully open configuration of Instance Three.

Instance Three shows the spine magnet 208 interacting with magnets 202(1) and 202(2) in a manner that biases the device toward this fully open orientation where the first and second portions 102 and 104 are juxtaposed and coplanar. Not only do the magnets function to bias the first and second portions toward the fully open orientation, the magnets function to maintain the device in this fully open orientation. The attractive force between the magnets 202(2), spine magnets 208, and magnets 202(1) can also cause the device portions to be pulled together until the device portions abut one another (discussed above relative to FIG. 18 and also shown in FIG. 20).

Instance Four show where the user has applied a force to fold or close the device. At this point, the attractive forces of the spine magnets 208 and the magnets 202 of the first and second portions 102 and 104 are decreasing and the attractive forces of the magnets 202(1) and 202(2) on each other is increasing. The attraction of magnets 202(1) and 202(2) can bias the device toward the orientation of Instance Five.

Instance Five shows the device in a closed orientation (e.g., angle α equals zero degrees). This orientation is identical to the orientation of Instance One except that the inward and outward facing surfaces are reversed. The attraction between magnets 202(1) and 202(2) biases the device to maintain this orientation (e.g., the device portions will not rotate away from one another unless acted upon by a force, such as the user rotating them apart).

Figure 22:
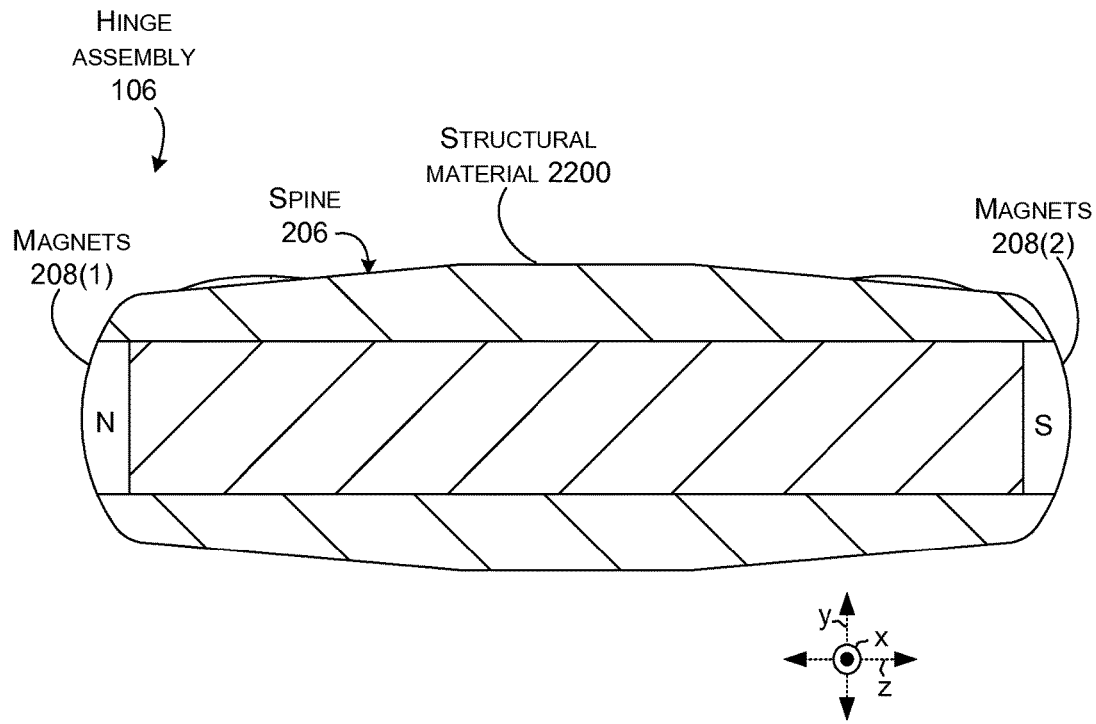
Figure 23:
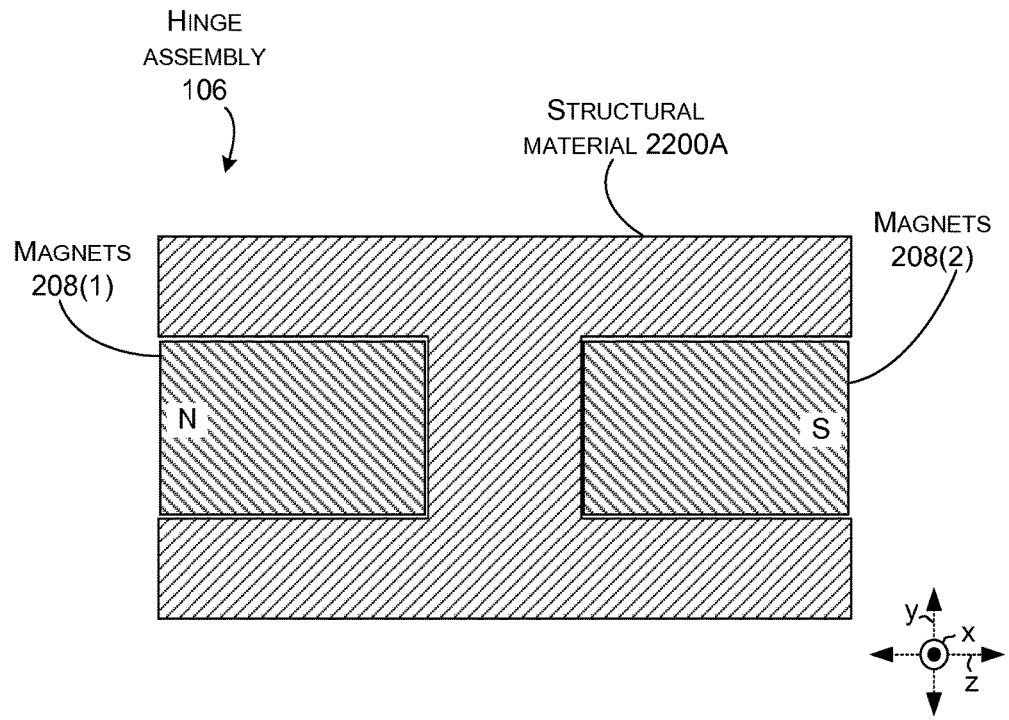

FIGS. 22-23 show cross-sections of two spine implementations.

FIG. 22 shows magnets 208(1) and 208(2) positioned at opposing ends of spine 206 with structural material 2200 interposed between. Structural material 2200 may be, for example, plastic or metal fabric overlaid with a cured polymer overlaid, cured foam, a combination of these materials, or other materials.

FIG. 23 shows structural material 2200A in the form of an I-beam with the magnets 208(1) and 208(2) positioned in opposing recesses formed by the I-beam structure.

Individual elements of the hinge assembly 106 can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, or any combination of these materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Example Methods

Various methods of manufacture, assembly, and use for hinge assemblies and devices are contemplated beyond those shown above relative to FIGS. 1-23.

Additional Examples

Various hinge assembly and device examples are described above. Additional examples are described below. One example can include a device comprising a first portion and a second portion and a hinge assembly secured to a hinge end of the first portion and a hinge end of the second portion to rotatably secure the first and second portions. The hinge assembly comprises a cam. The cam is configured to bring the hinge end of the first portion and the hinge end of the second portion toward one another when the device is opened and the first portion and the second portion are adjacent and coplanar. The cam is further configured to extend the hinge end of the first portion and the hinge end of the second portion away from one another when the first and second portions are extended toward one another to define an oblique angle.

Another example can include any combination of the above and/or below examples where the cam is located in the hinge assembly, or where the cam is configured to move the hinge assembly into and out of one of the first and second portions during rotation.

Another example can include any combination of the above and/or below examples where the hinge assembly defines first and second axes of rotation and where the cam comprises a first cam that acts relative to the first axis of rotation and a second cam that acts relative to the second axis of rotation.

Another example can include any combination of the above and/or below examples where the hinge assembly comprises a first hinge sub-assembly at a first end of the first and second portions and a second hinge sub-assembly at a second end of the first and second portions.

Another example can include any combination of the above and/or below examples where the device further comprises a spine extending between the first hinge sub-assembly and the second hinge sub-assembly.

Another example can include any combination of the above and/or below examples where the spine includes opposing recesses, and the device further comprises magnets positioned in the recesses.

Another example can include any combination of the above and/or below examples where the device further comprises additional magnets positioned in the first and second portions that interact with the magnets to predispose the first and second portions to orient at angles of 0 degrees relative to one another, 180 degrees relative to one another, or 360 degrees relative to one another rather than intervening angles.

Another example can include any combination of the above and/or below examples where the hinge ends of the first and second portions define a recess and where the assembly defines first and second axes of rotation and where the cam comprises a first cam that acts relative to the first axis of rotation and a second cam that acts relative to the second axis of rotation.

Another example can include any combination of the above and/or below examples where the hinge assembly is contained in the first and second portions when the first and second portions are oriented at 180 degrees relative to one another.

Another example can include any combination of the above and/or below examples where the hinge assembly predisposes the first and second portions to orient at angles of 0 degrees relative to one another, 180 degrees relative to one another, or 360 degrees relative to one another rather than intervening angles.

Another example can include a device comprising a first portion having a major surface and a second portion having another major surface. The device also comprises a spine hingeably securing the first and second portions through a range of angular orientations, where at a closed angular orientation the first and second portions are adjacent to one another and the major surface overlays the another major surface, and at an open angular orientation the major surface and the another major surface abut one another and are coplanar, and the spine is contained in recesses in one or both of the first and second portions.

Another example can include any combination of the above and/or below examples where the spine biases the first and second portions to the closed angular orientation and the open angular orientation.

Another example can include any combination of the above and/or below examples where the spine includes magnets that are oriented to attract other magnets in the first and second portion to bias the first and second portions to the open orientation, and where the other magnets in the first and second portions attract one another to bias the first and second portions to the closed orientation.

Another example can include any combination of the above and/or below examples where the first major surface and the second major surface comprise displays.

Another example can include any combination of the above and/or below examples where the device further includes a processor that generates a single graphical user interface for collective presentation across the displays when the device is in the open angular orientation and separate graphical user interfaces when the device is in other orientations.

Another example can include any combination of the above and/or below examples where the spine is rotatably secured to a first hinge arm that is slideably secured to the first portion and rotatably secured to a second hinge arm that is slideably secured to the second portion.

Another example can include any combination of the above and/or below examples where the first and second hinge arms include cam surfaces that define a distance there between during rotation.

Another example can include a device comprising a first portion and a second portion and a hinge assembly rotatably securing the first portion the second portion. The device further comprises a magnetic assembly positioned relative to the hinge assembly and the first and second portions that biases the first and second portions to a closed position where the first and second portions overlay one another and to a fully open position where the first and second portions are juxtaposed and coplanar.

Another example can include any combination of the above and/or below examples where the magnetic assembly further applies an attractive force to pull the first and second portions toward one another in the fully open position.

Another example can include any combination of the above and/or below examples where the attractive force pulls the first and second portions against one another in the fully open position.

Conclusion

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
a first portion and a second portion having respective hinge ends, top surfaces, and bottom surfaces, where intersections of the hinge ends and the top surfaces define inner corners of the first and second portions; and,
a hinge assembly secured to the hinge ends of the first portion and the second portion, the hinge assembly rotatably securing the first and second portions such that the top surfaces are folded together in a first closed orientation and the bottom surfaces are folded together in a second closed orientation that is 360 degrees rotation from the first closed orientation, the hinge assembly comprising a cam that brings the hinge end of the first portion and the hinge end of the second portion toward one another when the device is opened and the first portion and the second portion are adjacent and coplanar and hide the hinge assembly with respect to the top and bottom surfaces of the device, and wherein the cam comprises a cam surface that interacts with another cam surface of the hinge assembly to space the inner corner of the first portion and the inner corner of the second portion away from one another when the first and second portions are extended toward one another to define an oblique angle when the top surface is folded toward the first closed orientation, wherein the hinge assembly further comprises hinge pins that space apart from one another in response to the cam surface interacting with the another cam surface.

2. The device of claim 1, wherein the cam is located in the hinge assembly, or wherein the cam is configured to move the hinge assembly into and out of one of the first and second portions during rotation.

3. The device of claim 1, wherein the hinge assembly defines first and second axes of rotation and wherein the cam comprises a first cam that acts relative to the first axis of rotation and a second cam that acts relative to the second axis of rotation.

4. The device of claim 1, wherein the hinge assembly comprises a first hinge sub-assembly at a first end of the first and second portions and a second hinge sub-assembly at a second end of the first and second portions.

5. The device of claim 4, further comprising a spine extending between the first hinge sub-assembly and the second hinge sub-assembly.

6. The device of claim 5, wherein the spine includes opposing recesses, and further comprising magnets positioned in the recesses.

7. The device of claim 6, further comprising additional magnets positioned in the first and second portions that interact with the magnets to predispose the first and second portions to orient at angles of 0 degrees relative to one another, 180 degrees relative to one another, or 360 degrees relative to one another rather than intervening angles.

8. The device of claim 1, wherein the hinge assembly predisposes the first and second portions to orient at angles of 0 degrees relative to one another, 180 degrees relative to one another, or 360 degrees relative to one another rather than intervening angles.

9. The device of claim 1, wherein the hinge ends of the first and second portions define a recess and wherein the hinge assembly defines first and second axes of rotation and wherein the cam comprises a first cam that acts relative to the first axis of rotation and a second cam that acts relative to the second axis of rotation.

10. The device of claim 1, wherein the hinge assembly comprises a first hinge sub-assembly at a first end of the first and second portions and a second hinge sub-assembly at a second end of the first and second portions, and a spine extending between the first hinge sub-assembly and the second hinge sub-assembly, wherein the first hinge sub-assembly includes the cam and the spine includes the another cam surface.

11. A device, comprising:
a first portion and a second portion having inward and outward facing surfaces;
a hinge assembly rotatably securing the first portion and the second portion such that the inward facing surfaces are folded together and overlay one another in a first closed position and the outward facing surfaces are folded together and overlay one another in a second closed position, the hinge assembly comprising a cam surface, another cam surface, and hinge pins, where the hinge pins space apart from one another in response to the cam surface interacting with the another cam surface; and,
a magnetic assembly positioned relative to the hinge assembly and the first and second portions that biases the first and second portions to the first closed position where the inward facing surfaces overlay one another, to a fully open position where the first and second portions are juxtaposed and corners of the inward facing surfaces abut to form a single coplanar surface, and to the second closed position where the outward facing surfaces overlay one another.

12. The device of claim 11, wherein the magnetic assembly further applies an attractive force to pull the first and second portions toward one another in the fully open position.

13. The device of claim 12, wherein the attractive force pulls the first and second portions against one another in the fully open position.

14. A device, comprising:
a first portion and a second portion having respective hinge ends, top surfaces, and bottom surfaces, where intersections of the hinge ends and the top surfaces define inner corners of the first and second portions; and,
a hinge assembly secured to the hinge ends of the first portion and the second portion, the hinge assembly rotatably securing the first and second portions such that the top surfaces are folded together in a first closed orientation and the bottom surfaces are folded together in a second closed orientation, the hinge assembly comprising a cam surface that interacts with another cam surface of the hinge assembly to space the inner corner of the first portion and the inner corner of the second portion away from one another when the first and second portions are extended toward one another to define an oblique angle when the top surface is folded toward the first closed orientation, the hinge assembly further comprising hinge pins that space a part from one another in response to the cam surface interacting with the another cam surface.

15. The device of claim 14, wherein the hinge assembly comprises first and second hinge arms secured to the first and second portions, respectively, and wherein the first and second hinge arms define the hinge pins.

16. The device of claim 14, wherein the hinge assembly is hidden with respect to the top and bottom surfaces of the device when the device is in a fully opened position.

17. The device of claim 14, wherein the hinge assembly comprises first and second hinge arms secured to the first and second portions, respectively, and a spine there between, and the cam surface is positioned on the first hinge arm and the another cam surface is positioned on the spine.

18. The device of claim 14, wherein the hinge assembly comprises first and second hinge arms and a spine there between, the first hinge arm slideably secured to the first portion and rotatably secured to the spine, and the second hinge arm slideably secured to the second portion and rotatably secured to the spine.

19. The device of claim 14, wherein the top surfaces comprise displays.

20. The device of claim 19, further comprising a processor that generates a single graphical user interface for collective presentation across the displays when the device is in an open angular orientation and separate graphical user interfaces when the device is in other orientations.

* * * * *